(12) United States Patent
Hanaoka

(10) Patent No.: US 10,884,317 B2
(45) Date of Patent: Jan. 5, 2021

(54) OPTICAL DIAPHRAGM DEVICE, LENS BARREL AND IMAGING DEVICE OR PROJECTION DEVICE

(71) Applicant: Nittoh Inc., Nagano (JP)

(72) Inventor: Takafumi Hanaoka, Nagano (JP)

(73) Assignee: NITTOH INC., Nagano (JP)

(*) Notice: Subject to any disclaimer, the term of this patent is extended or adjusted under 35 U.S.C. 154(b) by 42 days.

(21) Appl. No.: 16/467,653

(22) PCT Filed: Nov. 22, 2017

(86) PCT No.: PCT/JP2017/042022
§ 371 (c)(1),
(2) Date: Jun. 7, 2019

(87) PCT Pub. No.: WO2018/105401
PCT Pub. Date: Jun. 14, 2018

(65) Prior Publication Data
US 2020/0089080 A1    Mar. 19, 2020

(30) Foreign Application Priority Data
Dec. 9, 2016  (JP) ................. 2016-239583

(51) Int. Cl.
*G03B 9/06*   (2006.01)
*G03B 7/12*   (2006.01)
*G03B 17/02*  (2006.01)

(52) U.S. Cl.
CPC ............. *G03B 9/06* (2013.01); *G03B 7/12* (2013.01); *G03B 17/02* (2013.01)

(58) Field of Classification Search
CPC ..................................... G03B 9/06
See application file for complete search history.

(56) References Cited

U.S. PATENT DOCUMENTS

2018/0180971 A1* 6/2018 Yoshizawa ............ G02B 5/005
2019/0179211 A1* 6/2019 Endo .................... G02B 5/005

FOREIGN PATENT DOCUMENTS

JP   H5-113591 A   5/1993

OTHER PUBLICATIONS

International Search Report in PCT/JP2017/042022, dated Feb. 13, 2018, 3pp.

* cited by examiner

Primary Examiner — Noam Reisner
(74) Attorney, Agent, or Firm — Hauptman Ham, LLP

(57) ABSTRACT

An optical diaphragm device includes a plurality of diaphragm blades including a first fixing boss protruding from one surface of a first planar plate toward a side in a first direction; and a moving boss protruding from another surface of the first planar plate toward a side in a second direction. The optical diagram device includes a plurality of light leakage prevention blades including a second fixing boss protruding from one surface of a second planar plate toward the side in the first direction. The optical diagram device includes a drive ring including a plurality of first cam grooves; a housing body capable of accommodating the diaphragm blades, the light leakage prevention blades, and the drive ring. A second cam groove is in the light leakage prevention blade. The moving boss is in the second cam groove, and is in the first cam groove.

8 Claims, 9 Drawing Sheets

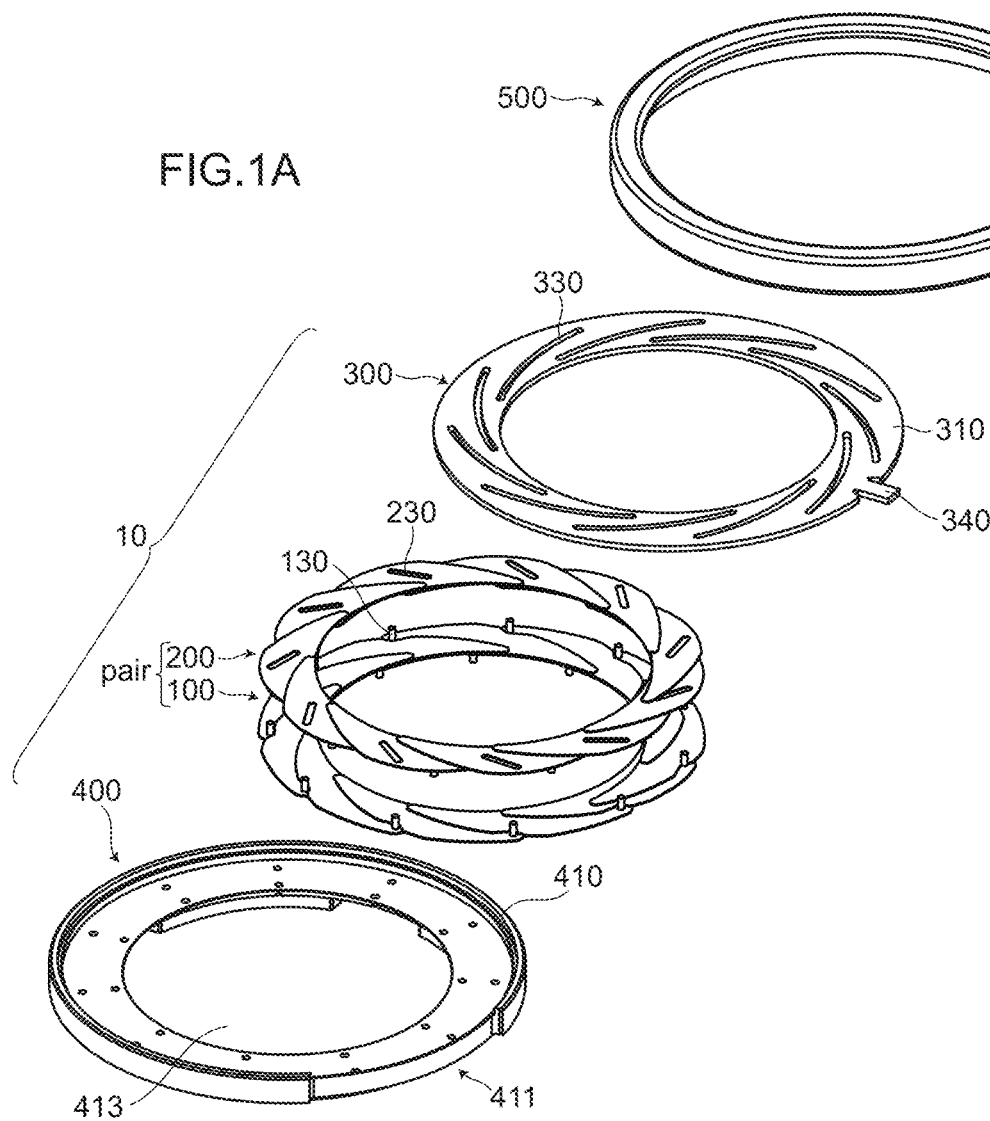
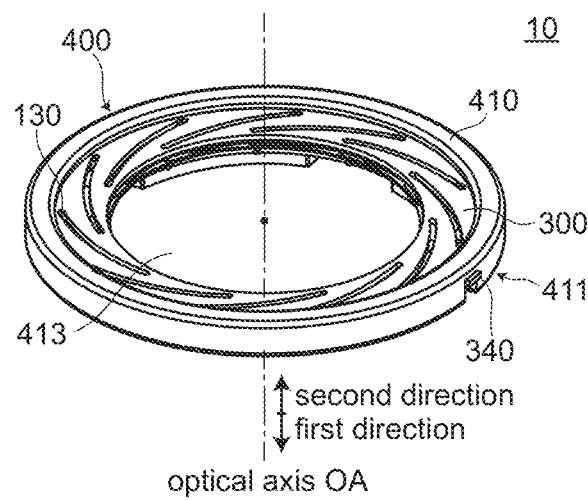

OPTICAL DIAPHRAGM DEVICE, LENS BARREL AND IMAGING DEVICE OR PROJECTION DEVICE

RELATED APPLICATIONS

The present application is a National Phase of International Application Number PCT/JP2017/042022, filed Nov. 22, 2017, which claims priority to Japanese Application Number 2016-239583, filed Dec. 9, 2016.

TECHNICAL FIELD

The present invention relates to an optical diaphragm device, a lens barrel and an imaging device or a projection device.

BACKGROUND ART

In an imaging device such as a camera, an optical diaphragm device is used for adjusting an amount of light from an imaging object which is incident on an imaging plane. The optical diaphragm device includes a circular ring-like housing body. When an aperture diameter of a diaphragm aperture becomes maximum (fully open), a diaphragm blade is retracted within a width of the housing body. Accordingly, with respect to a width of the housing body, it is necessary to ensure at least a width equal to or more than a width of the diaphragm blade as a retraction space for the diaphragm blade.

To narrow such a retraction space for the diaphragm blade for realizing downsizing of the optical diaphragm device, there has been conventionally made an attempt to narrow a width per se of the diaphragm blade (narrowing of a width of the diaphragm blade).

However, it is also known that when narrowing of the width of the diaphragm blade progresses, there arises a drawback that light easily leaks at a portion other than the diaphragm aperture.

To overcome such a drawback of leakage of light, there has been conventionally known an optical diaphragm device where a light leakage prevention blade is introduced in addition to a diaphragm blade, and a gap which causes leakage of light is shielded by the light leakage prevention blade (see patent literature 1, for example).

FIG. 10A to FIG. 10D are plan views for describing a conventional optical diaphragm device 900. FIG. 10A is a plan view of the optical diaphragm device 900 as viewed in a plan view along an optical axis OA. In FIG. 10A, only a state where light leakage prevention blades 920 protrude is shown, and the illustration of diaphragm blades 910 is omitted. FIG. 10B is a plan view showing the diaphragm blade 910, and FIG. 10C is a plan view showing the light leakage prevention blade 920, and FIG. 10D is a plan view showing a housing body 940.

As shown in FIG. 10A to 10D, the conventional optical diaphragm device 900 is an optical diaphragm device 900 for changing an aperture diameter of a diaphragm aperture by advancing or retracting a plurality of blades with respect to the optical axis OA. The optical diaphragm device 900 includes: a plurality of diaphragm blades 910 each having a diaphragm blade body 911, a diaphragm blade fixing boss 912 protruding from one surface of the diaphragm blade body 911 toward a side in a first direction along the optical axis OA, and a diaphragm blade moving boss 913 protruding from the other surface of the diaphragm blade body 911 toward a side in a second direction opposite to the first direction; a plurality of light leakage prevention blades 920 each forming a pair with each of the above-mentioned diaphragm blades 910, each light leakage prevention blade 920 having a light leakage prevention blade body 921, a light leakage prevention blade fixing boss 922 protruding from one surface of the light leakage prevention blade body 921 toward the side in the first direction, and a light leakage prevention blade moving boss 923 protruding from the other surface of the light leakage prevention blade body 921 toward the side in the second direction; a drive ring 930 having cam grooves 933 into each of which the moving boss is inserted in a state where a distance between the cam groove 933 and the optical axis OA differs corresponding to a position of the groove, the drive ring 930 being capable of rotating about the optical axis OA so as to move the cam grooves 933 in a circumferential direction about the optical axis OA; and a housing body 940 accommodating the diaphragm blades 910, the light leakage prevention blades 920, and the drive rig 930. The optical diaphragm device 900 includes a plurality of pairs each consisting of the diaphragm blade 910 and the light leakage prevention blade 920 (six pairs in the conventional optical diaphragm device 900 shown in FIGS. 10A to 10D). The cam grooves 933 are formed in the drive ring 930. The number of cam grooves 933 corresponds to the number of pairs each consisting of the diaphragm blade 910 and the light leakage prevention blade 920. A plurality of pairs each consisting of a first hole 941j and a second hole 942j are formed in the housing body 940 corresponding to the plurality of pairs each consisting of the diaphragm blade 910 and the light leakage prevention blade 920. The number of pairs each consisting of the first hole 941j and the second hole 942j corresponds to the number of pairs each consisting of the diaphragm blade and the light leakage prevention blade. The diaphragm blade fixing boss 912 and the light leakage prevention blade fixing boss 922 are inserted into the pair of the first hole 941j and the second hole 942j respectively. With respect to the diaphragm blade 910 and the light leakage prevention blade 920 which form the stacked pair, the diaphragm blade moving boss 913 and the light leakage prevention blade moving boss 923 are respectively inserted into one cam groove 933 (j: an integer of 1 or more).

According to the conventional optical diaphragm device 900, the light leakage prevention blades 920 can be added while using the existing basic structure for driving the diaphragm blades (the housing body, the drive ring and the like) without modification and hence, leakage of light brought about by narrowing of a width of the diaphragm blade can be prevented.

CITATION LIST

Patent Literature

PTL 1: JP 5-113591 A

SUMMARY OF INVENTION

Technical Problem

However, the conventional optical diaphragm device 900 adopts the structure where the diaphragm blade moving boss 913 and the light leakage prevention blade moving boss 923 are respectively inserted into one cam groove 933. With such a structure, two kinds of blades (the diaphragm blade 910 and the light leakage prevention blade 920) are driven by one cam groove 933. Accordingly, as a length of the cam groove 933, a length for driving the light leakage prevention blade 920 also becomes necessary in addition to a length for driving the diaphragm blade 910.

That is, it is necessary that the cam groove 933 is formed of a groove portion for driving the diaphragm blade 910 and a groove portion for driving the light leakage prevention blade 920. Accordingly, the cam groove 933 becomes necessary where the cam groove 933 has a long total length compared to the configuration where the cam groove 933 is formed of only the groove for driving only either one of the blades.

As described above, in the conventional optical diaphragm device 900, two kinds of blades are driven by one cam groove and hence, the long cam groove becomes necessary. Accordingly, it is difficult to increase the number of cam grooves formed in a limited space of the drive ring 930 and hence, it is difficult to increase the number of diaphragm blades.

Further, as shown in FIG. 10D, in the conventional optical diaphragm device 900, the first holes 941j and the second holes 942j are disposed at the positions which are at the same distance from the optical axis OA (the position being away from the optical axis OA by a distance R9). In other words, the first holes 941j and the second holes 942j are disposed along the same circumference C. That is, the diaphragm blade fixing bosses 912 and the light leakage prevention blade fixing bosses 922 which are respectively inserted into the first holes 941j and the second holes 942j are disposed at the positions which are at the same distance from the optical axis OA (disposed along the same circumference C).

In the conventional optical diaphragm device 900, the diaphragm blade fixing bosses 912 and the light leakage prevention blade fixing bosses 922 are disposed along the same circumference C. Accordingly, it is necessary to keep a required distance between the diaphragm blade fixing boss 912 and the light leakage prevention blade fixing boss 922. Accordingly, there exist many restrictive conditions in increasing the arrangement number of the diaphragm blade fixing bosses 912 and hence, it is difficult to increase the number of the diaphragm blades 910.

To describe for a reference purpose, with respect to a shape of a diaphragm aperture formed by a plurality of diaphragm blades, the shape closer to a circle than an angular shape is preferable from a viewpoint of improving quality of imaging, and the shape of the diaphragm aperture can be made as close as possible to a circle by increasing the number of diaphragm blades. Accordingly, it is desirable to increase the number of diaphragm blades from a viewpoint of improving quality of imaging.

The present invention has been made in view of the above-mentioned circumstances, and it is an object of the present invention to provide an optical diaphragm device where the number of diaphragm blades can be easily increased.

Solution to Problem

[1] An optical diaphragm device according to the present invention is an optical diaphragm device capable of changing an aperture diameter of a diaphragm aperture by advancing or retracting a plurality of blades with respect to an optical axis, the optical diaphragm device comprising:

a plurality of diaphragm blades each including: a first blade portion which is formed of a first planar plate and shields light incident on the diaphragm aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction;

a plurality of light leakage prevention blades each including: a second blade portion which is formed of a second planar plate and shields light through light leaking portions other than the diaphragm aperture of the optical diaphragm device; and a second fixing boss which protrudes from one surface of the second planar plate toward the side in the first direction, the light leakage prevention blade forming a pair with the diaphragm blade;

a drive ring having a plurality of first cam grooves into each of which the moving boss is inserted, wherein a distance between the first cam groove and the optical axis differs corresponding to a position of the first cam groove, and the first cam groove is movable in a circumferential direction about the optical axis due to rotation of the drive ring about the optical axis; and a housing body capable of accommodating the diaphragm blades, the light leakage prevention blades, and the drive ring, wherein the optical diaphragm device includes a plurality of pairs each consisting of the diaphragm blade and the light leakage prevention blade, and a plurality of the first cam grooves each of which corresponds to each of the moving bosses are formed in the drive ring, a plurality of pairs each consisting of a first hole and a second hole are formed in the housing body corresponding to the plurality of pairs each consisting of the diaphragm blade and the light leakage prevention blade, the number of pairs each consisting of the first hole and the second hole being equal to the number of pairs each consisting of the diaphragm blade and the light leakage prevention blade, the first fixing boss and the second fixing boss being inserted into the pair of the first hole and the second hole respectively, a second cam groove is formed in the light leakage prevention blade, the moving boss of the diaphragm blade is inserted into the second cam groove of the light leakage prevention blade, and is inserted into the first cam groove of the drive ring, and a position where a set (combination) of the first fixing boss and the first hole is disposed and a position where a set (combination) of the second fixing boss and the second hole is disposed differ from each other in distance from the optical axis.

The second cam groove is further formed in the light leakage prevention blade, the moving boss of the diaphragm blade is inserted into the second cam groove of the light leakage prevention blade and the first cam groove of the drive ring. Accordingly, when the drive ring is rotated, a force acts on the moving boss of the diaphragm blade through the first cam groove of the drive ring, and the first blade portion of the diaphragm blade is rotated using the first fixing boss as a fulcrum (rotary shaft). At the same time, along with the movement of the moving boss along the first cam groove, a force acts on the second cam groove of the light leakage prevention blade through the moving boss, and the second blade portion of the light leakage prevention blade is rotated using the second fixing boss as the fulcrum (rotary shaft). In this manner, although the boss which is inserted into the first cam groove of the drive ring is only the moving boss of the diaphragm blade, the light leakage prevention blade can be also driven in an interlocking manner in a step where the diaphragm blade is driven.

According to such an optical diaphragm device, it is unnecessary to form a cam groove pattern for driving the light leakage prevention blade on the first cam groove. Accordingly, a length of the first cam groove can be set shorter than a length of a cam groove in a conventional optical diaphragm device by an amount that the formation of the cam groove pattern becomes unnecessary. Since the length of the first cam groove can be shortened, the number of first cam grooves formed on the drive ring can be easily increased.

Further, the set of the first fixing boss and the first hole is disposed at the position which differs from the position where the set of the second fixing boss and the second hole is positioned with respect to a distance from the optical axis. Accordingly, the circumference on which the set of the first fixing boss and the first hole is disposed and the circumference on which the set of the second fixing boss and the second hole is disposed differ from each other with respect to the distance from the optical axis. Accordingly, it is possible to easily increase the number of pairs each consisting of the set of the first fixing boss and the first hole and the set of the second fixing boss and the second hole. As a result, it is possible to easily increase the number of diaphragm blades.

In this manner, according to the optical diaphragm device of the present invention, it is possible to provide the optical diaphragm device where the number of diaphragm blades can be easily increased.

[2] In the optical diaphragm device of the present invention, it is preferable that the set of the first fixing boss and the first hole be disposed at a position where the distance from the optical axis to the set of the first fixing boss and the first hole is shorter than the distance from the optical axis to the set of the second fixing boss and the second hole.

In other words, the position where the set of the first fixing boss and the first hole is disposed is the position where the rotary shaft of the diaphragm blade is disposed.

In such a configuration, an attention is focused on a rotation angle of the diaphragm blade which rotates between a position in a state where the aperture diameter of the diaphragm aperture is maximized (fully open state) and a position in a state where the aperture diameter of the diaphragm aperture is minimized (minimum aperture state). In general, the nearer the rotary shaft of the diaphragm blade is disposed to the optical axis, the larger the rotation angle becomes. When the rotation angle of the diaphragm blade is increased, in general, driving of the diaphragm blade is minimally affected by irregularities in manufacture in positions, sizes or the like of the first fixing boss, the first hole, the moving boss, the first cam groove of the drive ring and the like.

In view of the above, it is possible to realize the diaphragm aperture with high accuracy as a whole by arranging the rotary shaft of the diaphragm blade at the position closer to the optical axis.

Further, in general, along with the increase of a distance between the position at which the rotary shaft of the diaphragm blade is disposed and the optical axis, it is necessary to increase a length of the diaphragm blade.

In view of the above, the length of the diaphragm blade can be decreased by arranging the rotary shaft of the diaphragm blade closer to the optical axis (by arranging the set of the first fixing boss and the first hole at the position closer to the optical axis than the position of the set of the second fixing boss and the second hole). By decreasing the length of the diaphragm blade, inertia of the diaphragm blade during rotation can be decreased and hence, accuracy of rotation and velocity of rotation can be enhanced. Downsizing of the optical diaphragm device can be also realized.

[3] In the optical diaphragm device of the present invention, it is preferable that the set of the first fixing boss and the first hole and the set of the second fixing boss and the second hole be arranged on a same straight line extending in a radial direction from the optical axis.

With such a configuration, an angle which the set of the first fixing boss and the first hole and the set of the second fixing boss and the second hole which form a pair occupy (an angle made by a line which connects the set of the first fixing boss and the first hole with the optical axis and a line which connects the set of the second fixing boss and the second hole with the optical axis) can be minimized (0 degrees). As described above, the occupied angle can be minimized and hence, it is possible to arrange the larger number of pairs each consisting of the set of the first fixing boss and the first hole and the set of the second fixing boss and the second hole around the optical axis whereby the degree of freedom in designing the optical diaphragm device can be enhanced.

With such a configuration, it is possible to provide the optical diaphragm device which enables easy working (drilling) and inspection of the optical diaphragm device. For example, when the first holes and the second holes are formed in the housing body by working with reference to the optical axis, it is sufficient that the first holes are formed by working and, thereafter, the second holes are formed by working by changing only a distance in a radial direction without changing an angle with respect to the optical axis. Accordingly, working can be continued without performing a step of changing an angle. Substantially the same manner of operation and advantageous effects can be acquired also in the inspection of the optical diaphragm device.

[4] In the optical diaphragm device of the present invention, it is preferable that, on an outer peripheral edge of the diaphragm blade, a recessed portion be formed by cutting away such that when the diaphragm blade is moved to a position where the aperture diameter of the diaphragm aperture becomes maximum, the moving boss with respect to the diaphragm blade and the light leakage prevention blade which form another pair is disposed inside the recessed portion.

With such an optical diaphragm device, it is possible to avoid the interference between the diaphragm blade of the diaphragm blade and the light leakage prevention blade which form a pair and the second fixing boss with respect to the diaphragm blade and the light leakage prevention blade which form another pair and hence, large-sizing of the optical diaphragm device can be suppressed.

[5] In the optical diaphragm device of the present invention, it is preferable that, with respect to a rotational direction of the drive ring, assuming a direction that the diaphragm blade is moved toward the optical axis by moving the first cam groove due to rotation of the drive ring as a diaphragm rotational direction, the first cam groove be formed at an angle inclined in a direction away from the optical axis as the first cam groove extends in the diaphragm rotational direction with respect to the circumferential direction about the optical axis.

By adopting the first cam groove having such inclination, when the drive ring is rotated in the diaphragm rotational direction, the position of the moving boss inserted into the first cam groove formed in the drive ring is moved in the direction toward the optical axis. With such a configuration, a length of the first cam groove can be decreased compared to the configuration where the inclination direction of the first cam groove is reversed.

[6] In the optical diaphragm device of the present invention, it is preferable that an angle of the second cam groove with respect to the circumferential direction be set large compared to an angle of the first cam groove with respect to the circumferential direction.

To describe the above-mentioned configuration in other words, the second cam groove is formed with a relatively large (deep) angle with respect to the circumferential direction (compared to an angle of the first cam groove with respect to the circumferential direction).

Accordingly, it is possible to make a track of the second cam groove (a moving path of the moving boss) more approximate an arc which the moving boss draws when the moving boss rotates about the first fixing boss. Accordingly, compared to the case where the second cam groove makes a small (shallow) angle with respect to the circumferential direction (the case where such an angle is equal to or below the angle which the first cam groove makes with respect to the circumferential direction), a force with which the second cam groove and the moving boss come into contact with each other in the circumferential direction can be decreased and hence, the diaphragm blade and the light leakage prevention blade can be smoothly rotated.

[7] A lens barrel according to the present invention is characterized in that the optical diaphragm device described in any one of the above-mentioned [1] to [6] and a lens are housed in the lens barrel.

[8] An imaging device or a projection device according to the present invention is characterized in that the imaging device or the projection device includes the optical diaphragm device described in any one of the above-mentioned [1] to [6] or the lens barrel described in the above-mentioned [7].

BRIEF DESCRIPTION OF DRAWINGS

FIG. 1A and FIG. 1B are perspective views for describing an optical diaphragm device 10 according to an embodiment 1.

DESCRIPTION OF EMBODIMENTS

Hereinafter, an optical diaphragm device, a lens barrel and an imaging device or a projection device according to the present invention are described in detail based on embodiments shown in drawings.

Embodiment 1

1. Basic Structure of Optical Diaphragm Device 10 According to Embodiment 1

Figure 2A:
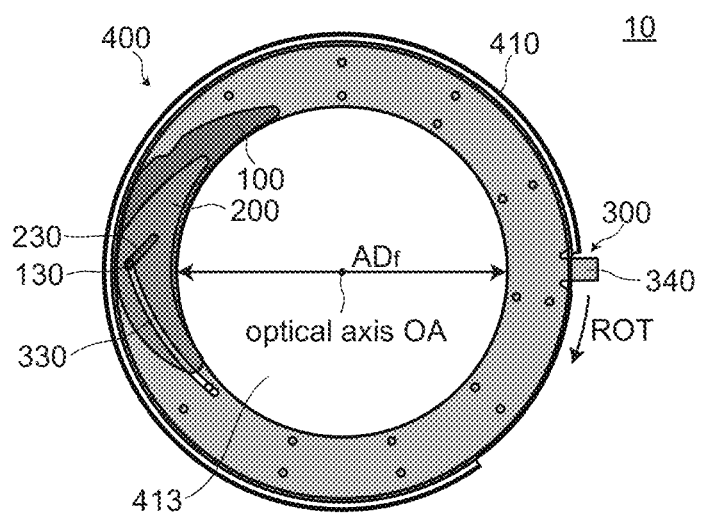
FIG. 2A to FIG. 2C are plan views for describing the optical diaphragm device 10 according to the embodiment 1.
Figure 2B:
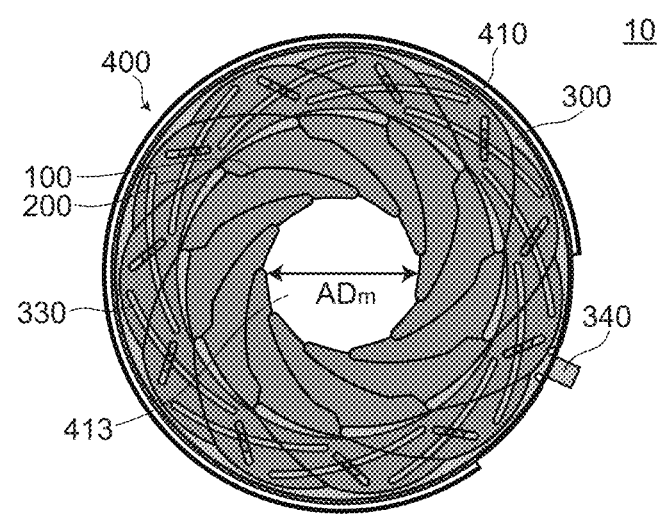
Figure 2C:
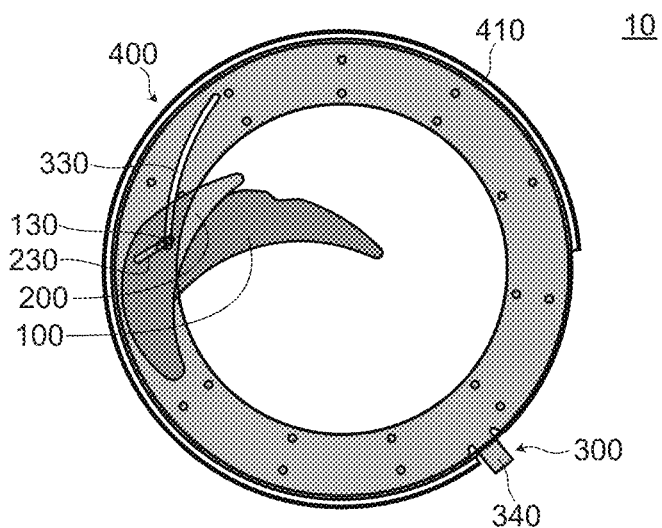

FIG. 1A, FIG. 1B and FIGS. 2A to 2C are views for describing an optical diaphragm device 10 according to the embodiment 1. FIG. 1A is a perspective view showing a state where the optical diaphragm device 10 is disassembled. FIG. 1B is a perspective view of the optical diaphragm device 10 in an assembled state. FIGS. 2A to 2C is a plan view of the optical diaphragm device 10 as viewed in a plan view along an optical axis OA. FIG. 2A shows a state where a diaphragm blade 100 and a light leakage prevention blade 200 are retracted within a width (a width in a direction orthogonal to the optical axis OA) of a housing body 400. FIG. 2A shows a state where an aperture diameter of a diaphragm aperture (an aperture formed by the diaphragm blades 100) is set to a maximum value (fully open state). FIG. 2C is a view showing a minimum aperture state where the aperture diameter of the diaphragm aperture is set to a minimum value. FIG. 2B is a view showing an intermediate aperture state where the diaphragm blades 100 and the light leakage prevention blades 200 are moved to a position between the fully open state and the minimum aperture state. In FIG. 2A and FIG. 2C the diaphragm blade 100 and the light leakage prevention blade 200 which form a pair, and a first cam groove 330 which corresponds to the diaphragm blade 100 and the light leakage prevention blade 200 are illustrated, and other diaphragm blades, light leakage prevention blades, and first cam grooves are omitted from the drawings. A cover 500 is mounted on the housing body 400 for preventing the removal of a drive ring 300.

As shown in FIG. 1A, FIG. 1B and FIGS. 2A to 2C, the optical diaphragm device 10 according to the embodiment 1 has a circular ring shape having an aperture 413 as viewed in a plan view along the optical axis OA. An aperture diameter AD of the diaphragm aperture is changed by protruding a plurality of blades (diaphragm blades 100 in this embodiment) toward the inside of the aperture 413 (toward the optical axis OA). An amount of light which passes through the diaphragm aperture is adjusted by changing the aperture diameter AD of the diaphragm aperture.

The optical diaphragm device 10 includes the diaphragm blades 100, the light leakage prevention blades 200, the drive ring 300, and the housing body 400. Using the housing body 400 as a receiving tray, the plurality of diaphragm blades 100 and the plurality of light leakage prevention blades 200 are stacked on the housing body 400 in an overlapping manner, and the drive ring 300 is placed on the diaphragm blades 100 and the light leakage prevention blades 200. Further, the cover 500 is placed on the drive ring 300.

As shown in FIG. 2A to FIG. 2C, the aperture diameter AD of the diaphragm is changed in a transcending manner from an aperture diameter ADf to an aperture diameter ADm and, then, from the aperture diameter ADm to the aperture diameter in a minimum aperture state corresponding to a protruding amount of the diaphragm blades 100 toward the inside of the aperture 413.

2. Detailed Structure of Optical Diaphragm Device According to Embodiment 1

(1) Moving Boss 130 Inserted into Second Cam Groove 230 as Well as First Cam Groove 330

Figure 3:
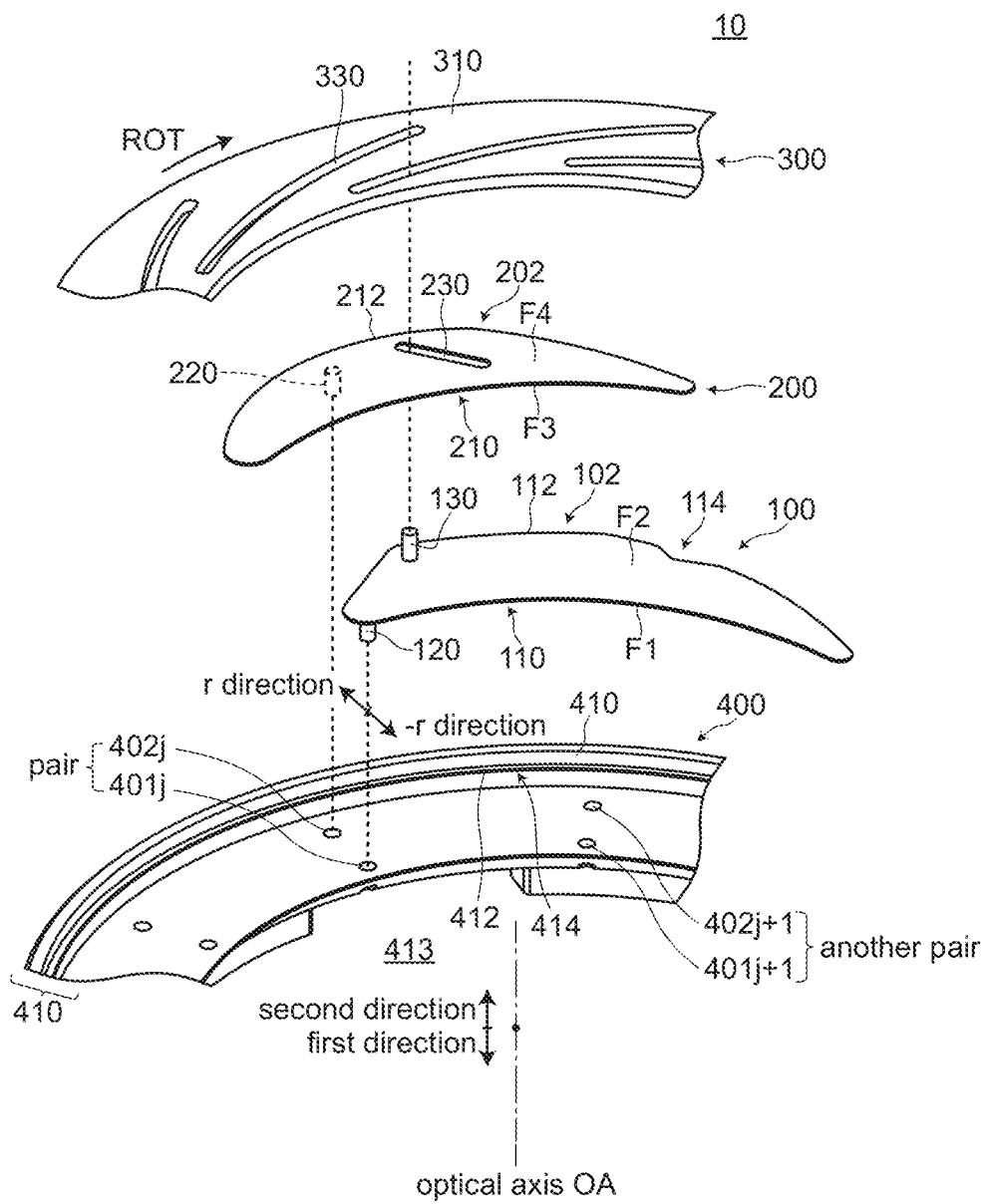
FIG. 3 is a perspective view for describing a main part of the optical diaphragm device 10 according to the embodiment 1.

FIG. 3 is a view for describing a main part of the optical diaphragm device 10 according to the embodiment 1. FIG. 3 is a perspective view of the diaphragm blade 100 and the light leakage prevention blade 200 which form a pair, and portions of the drive ring 300 and the housing body 400 which correspond to the diaphragm blade 100 and the light leakage prevention blade 200 by spotlighting these constitutional elements. Other constitutional elements are omitted from the drawing. Symbol 112 indicates an outer peripheral edge of a first blade portion 110, and symbol 212 indicates an outer peripheral edge of a second blade portion 210.

As shown in FIG. 3, the diaphragm blade 100 has: the first blade portion 110 which is formed of a first planar plate 102, protrudes toward the inside of the aperture 413 thus forming a diaphragm aperture, and shields light incident on the diaphragm aperture of the optical diaphragm device 10 (also see FIG. 2A to FIG. 2C); a first fixing boss 120 which protrudes from one surface F1 of the first planar plate 102 toward a side in a first direction along the optical axis OA; and a moving boss 130 which protrudes from the other surface F2 of the first planar plate 102 toward a side in a second direction opposite to the first direction.

The first planar plate 102 has light shielding property, and is made of a material which allows the first planar plate 102 to mate with and to smoothly slide on other constitutional elements (the light leakage prevention blade 200, the housing body 400 and the like). The first fixing boss 120 and the moving boss 130 have a circular cylindrical shape and have a fixed radius respectively. The first fixing boss 120 is inserted into a first hole 401j formed in the housing body 400 in a revolvable manner. That is, the position where the set of the first fixing boss 120 and the first hole 401j is disposed is the position where the rotary shaft of the diaphragm blade 100 is disposed. "Fixing" of the first fixing boss 120 means that the position of the boss with respect to the housing body is not moved and is fixed, and the first fixing boss 120 per se is revolvable.

The light leakage prevention blade 200 has: a second blade portion 210 which is formed of a second planar plate 202 and shields light through light leaking portions other than the diaphragm aperture of the optical diaphragm device 10 (also see FIG. 2C); and a second fixing boss 220 which protrudes from one surface F3 of the second planar plate 202 toward the side in the first direction. Such a light leakage prevention blade 200 forms a pair with the above-mentioned diaphragm blade 100.

In the same manner as the first planar plate 102, the second planar plate 202 is made of a material which allows the second planar plate 202 to mate with and to smoothly slide on other constitutional elements (the diaphragm blade 100, the housing body 400 and the like). The second fixing boss 220 has a circular cylindrical shape and having a fixed radius. The second fixing boss 220 is inserted into a second hole 402j formed in the housing body 400 in a revolvable manner. That is, the position where the second fixing boss 220 and the second hole 402j are disposed is the position where the rotary shaft of the light leakage prevention blade 200 is disposed. "fixing" of the second fixing boss 220 means that the position of the boss with respect to the housing body is not moved and is fixed, and the second fixing boss 220 per se is revolvable.

As shown in FIG. 1A and FIG. 1B to FIG. 3, the first cam grooves 330 are formed in the drive ring 300. The drive ring 300 is a ring-like planar plate which has a circular opening on an inner side.

The moving boss 130 is inserted into the first cam groove 330. The first cam groove 300 is formed such that a distance between the first cam groove 330 and the optical axis OA differs corresponding to a position of the cam groove. However, the first cam groove 330 may partially have a zone where the distance between the first cam groove 330 and the optical axis OA is equal when the cam groove is viewed along a circumferential direction.

When such a drive ring 300 is rotated about the optical axis OA, the first cam groove 330 is moved in the circumferential direction about the optical axis OA. In this case, the moving boss 130 inserted into the first cam groove 330 is rotated about the first fixing boss 120 inserted into the first hole 401j. That is, the moving boss 130 is moved in a direction toward the inside of the aperture 413 (hereinafter referred to as −r direction) or in a direction toward the outside of the aperture 413 (hereinafter referred to as r direction) using the first fixing boss 120 as the center of rotation corresponding to a direction that the drive ring 300 is rotated.

Although any method is adopted as a method for imparting a rotational force to the drive ring 300, in the embodiment 1, a rotary lever 340 which integrally rotates with a drive ring body 310 is formed on the drive ring 300, and a force is applied to the rotary lever 340 by a rotational force applying unit not shown in the drawing.

As shown in FIG. 1A and FIG. 1B to FIG. 3, the housing body 400 has a circular ring shape as an overall shape, and has the aperture 413 in the inside thereof. As described previously, the housing body 400 accommodates the diaphragm blades 100, the light leakage prevention blades 200, and the drive ring 300.

n sets each consisting of the first hole 401j and the second hole 402j (n being the number of pairs each consisting of the diaphragm blade 100 and the light leakage prevention blade 200) (n: an integer of 2 or more) are formed in the housing body 400. The first hole 401j and the second hole 402j are formed corresponding to the above-mentioned diaphragm blade 100 and the light leakage prevention blade 200 which form a pair. The first fixing boss 120 and the second fixing boss 220 are inserted into the pair of first hole 401j and the second hole 402j respectively.

Further, as shown in FIG. 1A, the housing body 400 has a notched portion 411. The notched portion 411 is formed by cutting away a portion of an outer peripheral wall 410 so as to allow the rotation of the rotary lever 340 of the drive ring 300.

As a whole, the optical diaphragm device 10 has n sets (a plurality of pairs) each consisting of the diaphragm blade 100 and the light leakage prevention blade 200. n pieces (a plurality of) first cam grooves 330 are formed in the drive ring 300 such that the first cam grooves 330 respectively correspond to the moving bosses 130 formed on the respective diaphragm blades 100. For example, the optical diaphragm device 10 has 11 sets each consisting of the diaphragm blade 100 and the light leakage prevention blade 200 as shown in FIG. 1A and FIG. 1B to FIG. 3.

As shown in FIG. 2A, FIG. 2C, FIG. 3 and the like, the diaphragm blade 100 and the light leakage prevention blade 200 which form a pair are stacked on the housing body 400 toward a second direction in order of the diaphragm blade 100 and the light leakage prevention blade 200.

In addition to the above-mentioned configuration, a second cam groove 230 is formed in the light leakage prevention blade 200. The second cam groove 230 is disposed at the position which corresponds to the moving boss 130.

The moving boss 130 of the diaphragm blade 100 is inserted into the second cam groove 230 of the light leakage prevention blade 200, and is also inserted into the first cam groove 330 of the drive ring 300.

Although the moving boss 130 is "inserted into" the first cam groove 330 and the second cam groove 230, the moving boss 130 may not be inserted into the first cam groove 330 over a full depth (a thickness of the drive ring 300), or may penetrate the first cam groove 330 in addition to the second cam groove 230. In the embodiment 1, the moving boss 130 is in a state where the moving boss 130 substantially penetrates the first cam groove 330.

(2) Arrangement Relationship Between First Fixing Boss 120 and Second Fixing Boss 220

Figure 4A:
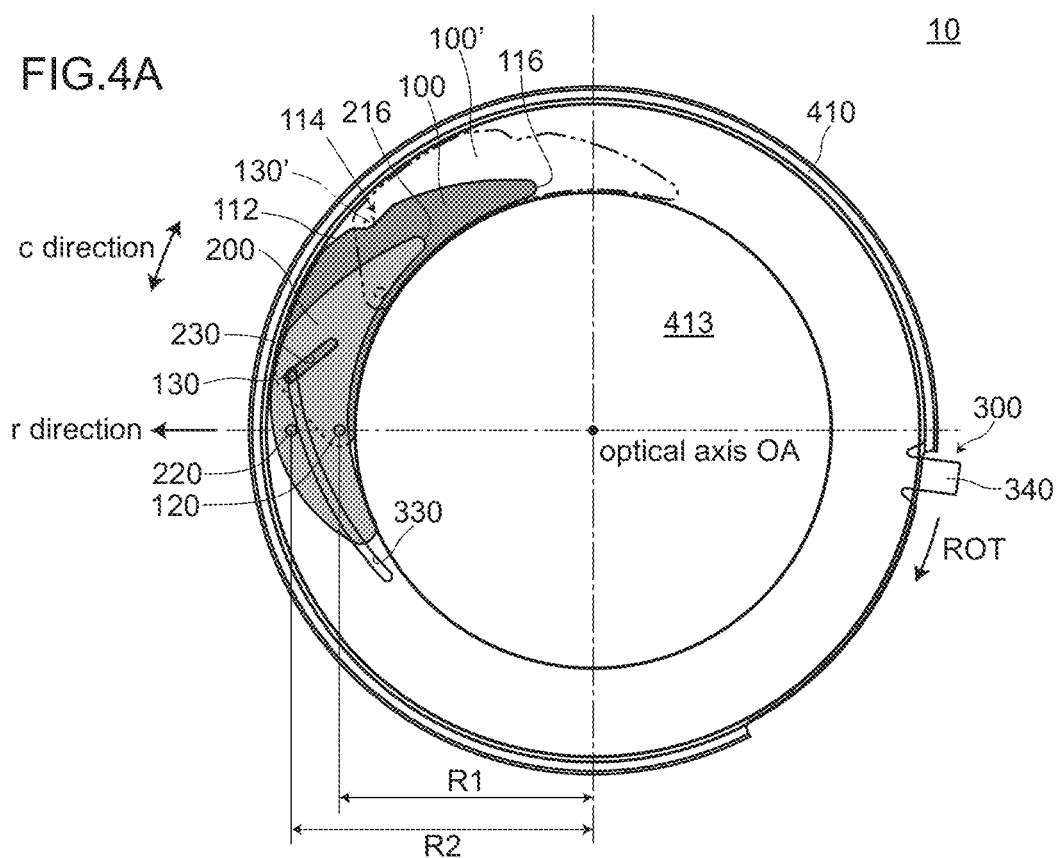
FIG. 4A and FIG. 4B are plan views for describing a positional relationship between a first fixing boss 120, a second fixing boss 220, a moving boss 130, a first cam groove 330, and a second cam groove 230 and the like in the optical diaphragm device 10 according to the embodiment 1.
Figure 4B:
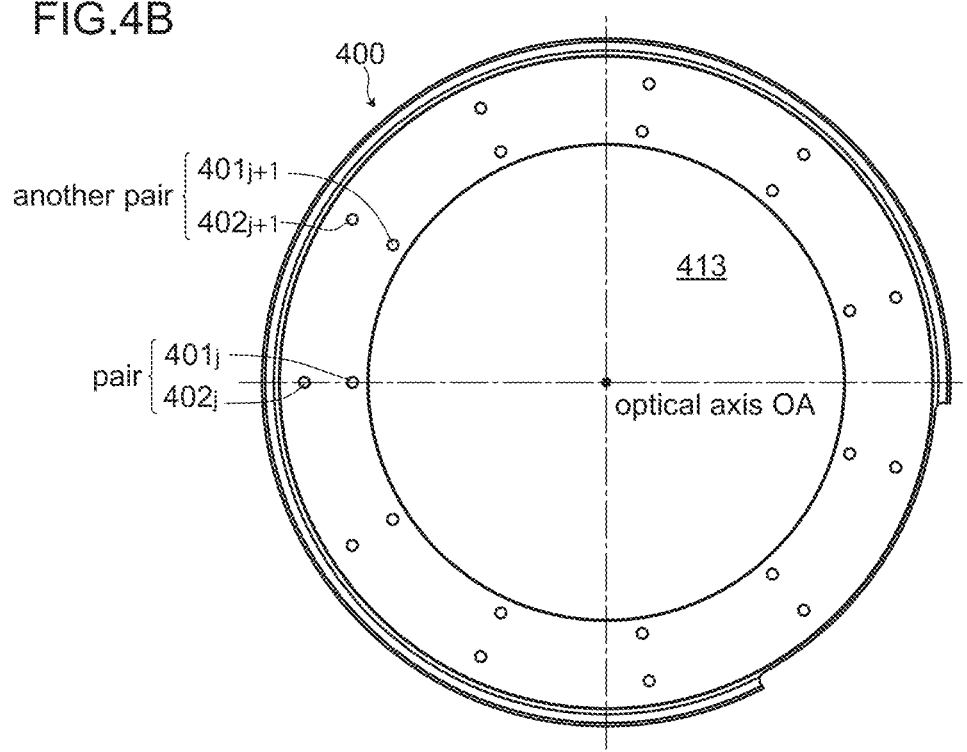

FIG. 4A and FIG. 4B is a plan view for describing a positional relationship between the first fixing boss 120, the second fixing boss 220, the moving boss 130, the first cam groove 330, the second cam groove 230 and the like in the optical diaphragm device 10 according to the embodiment 1. FIG. 4A shows the diaphragm blade 100 and the light leakage prevention blade 200 which form a pair, and the first cam groove 330 and the second cam groove 230 which correspond to these blades 100, 200. FIG. 4A and FIG. 4B also shows the diaphragm blade 100' out of the diaphragm blade and the light leakage prevention blade which form another pair and the moving boss 130' corresponding to the diaphragm blade 100'. The diaphragm blades and the light leakage prevention blades which form other pairs and constitutional elements which correspond to these blades are not shown in the drawing. FIG. 4B shows a mode where a plurality of pairs each consisting of the first hole 401j and the second hole 402j (j: an integer of 1 or more) into which the first fixing boss 120 and the second fixing boss 220 are inserted are formed in the housing body 400. Other constitutional elements are omitted from the drawing.

In the optical diaphragm device 10 according to the embodiment 1, as shown in FIG. 4A and FIG. 4B, the first fixing boss 120 and the second fixing boss 220 are disposed at positions which differ from each other in distance from the optical axis OA. In other words, the first fixing boss 120 and the second fixing boss 220 are disposed in a displaced manner toward an inner peripheral side and an outer peripheral side respectively (also see FIG. 3 and the like). For example, to describe the above-mentioned arrangement with reference to FIG. 4A, assuming a distance from the optical axis OA to the first fixing boss 120 as R1 and a distance from the optical axis OA to the second fixing boss 220 as R2, the first fixing boss 120 and the second fixing boss 220 are disposed so as to satisfy a relationship of R2>R1.

In correspondence with the arrangement relationship between the first fixing boss 120 and the second fixing boss 220, in the housing body 400, the first hole 401j and the second hole 402j which form a pair and into which the first fixing boss 120 and the second fixing boss 220 are inserted are disposed at positions which differ from each other in distance from the optical axis OA.

FIG. 4A shows the example where the first fixing boss 120 is disposed on an inner peripheral side. However, the optical diaphragm device 10 of the embodiment 1 is not limited to such an example. That is, the second fixing boss 220 may be disposed on an inner peripheral side of the first fixing boss 120.

3. Manner of Operation and Advantageous Effects of Optical Diaphragm Device 10 According to Embodiment 1

(1) Moving Boss 130 Inserted into Second Cam Groove 230 as Well as First Cam Groove 330

As described above, the optical diaphragm device 10 according to the embodiment 1 is an optical diaphragm device which changes an aperture diameter of the diaphragm aperture by advancing or retracting the plurality of blades with respect to the optical axis, and the optical diaphragm device 10 includes: the diaphragm blades 100; the light leakage prevention blades 200 each forms a pair with each corresponding diaphragm blade 100; the drive ring 300; and the housing body 400.

The diaphragm blade 100 has: the first blade portion 110 which is formed of the first planar plate 102 and shields light incident on the diaphragm aperture (aperture formed by the diaphragm blades 100) of the optical diaphragm device 10; the first fixing boss 120 which protrudes from one surface F1 of the first planar plate 102 toward the side in the first direction along the optical axis OA; and the moving boss 130 which protrudes from the other surface F2 of the first planar plate 102 toward the side in the second direction opposite to the first direction.

The light leakage prevention blade 200 has: the second blade portion 210 which is formed of the second planar plate 202 and shields light through light leaking portions other than the diaphragm aperture of the optical diaphragm device 10; and the second fixing boss 220 which protrudes from one surface F3 of the second planar plate 202 toward the side in the first direction.

The drive ring 300 has the first cam grooves 330 into which the moving bosses 130 are inserted. With respect to the first cam groove 330, a distance between the first cam groove 330 and the optical axis OA differs corresponding to the position of the cam groove. The drive ring 300 is rotatable about the optical axis OA. Accordingly, when the drive ring 300 is rotated about the optical axis OA, the first cam grooves 330 are moved in a circumferential direction. Accordingly, the moving bosses 130 inserted into the first cam grooves 330 are moved in an r direction or a −r direction.

The housing body 400 accommodates the diaphragm blades 100, the light leakage prevention blades 200 and the drive ring 300.

The optical diaphragm device 10 includes n sets (a plurality of pairs) each consisting of the diaphragm blade 100 and the light leakage prevention blade 200. n pieces of (a plurality of) first cam grooves 330 are formed in the drive ring 300 respectively corresponding to the moving bosses 130 formed on the respective diaphragm blades 100.

n sets each consisting of the first hole 401j and the second hole 402j (n being the number of pairs each consisting of the diaphragm blade 100 and the light leakage prevention blade 200) are formed in the housing body 400. The first fixing boss 120 and the second fixing boss 220 are respectively inserted into each pair consisting of the first hole 401j and the second hole 402j corresponding to the diaphragm blade 100 and the light leakage prevention blade 200 which form a pair.

The second cam groove 230 is formed in the light leakage prevention blade 200, and the moving boss 130 of the diaphragm blade 100 is inserted into the second cam groove 230 of the light leakage prevention blade 200 and is inserted into the first cam groove 330 of the drive ring 300.

In the optical diaphragm device 10 according to the embodiment 1, as described above, the second cam groove 230 is further formed in the light leakage prevention blade 200. The moving boss 130 of the diaphragm blade 100 is inserted into the second cam groove 230 of the light leakage prevention blade 200 and is inserted into the first cam groove 330 of the drive ring 300.

With such a structure, the following operations are performed.

(1) The drive ring 300 is rotated by receiving a rotational force from a rotational force applying unit not shown in the drawing.

(2) When the drive ring 300 is rotated, in the diaphragm blade 100, a force acts on the moving boss 130 from the drive ring 300 by way of the first cam groove 330. That is, the diaphragm blade 100 is rotated using the moving boss 130 as a point where a force is applied and the first fixing boss 120 as a fulcrum (rotary shaft).

(3) Along with the rotation (movement in the −r direction) of the moving boss 130 about the first fixing boss 120, in the light leakage prevention blade 200, a force acts on the second cam groove 230 from the moving boss 130. That is, the light leakage prevention blade 200 is rotated using a portion where a force acts on the second cam groove 230 from the moving boss 130 as a point where the force is applied and the second fixing boss 220 as a fulcrum (rotary shaft) (see FIG. 2C, FIG. 3 and the like).

In this manner, in the optical diaphragm device 10 according to the embodiment 1, although the boss which is inserted into the first cam groove 330 of the drive ring 300 is only the moving boss 130 of the diaphragm blade 100, the light leakage prevention blade 200 can be also driven in an interlocking manner with driving of the diaphragm blade 100.

Accordingly, it is sufficient to set the length of the first cam groove 330 to a length necessary for driving the diaphragm blade 100, and it is unnecessary to form a cam groove for driving the light leakage prevention blade 200. Accordingly, the length of the first cam groove 330 can be made shorter than the length of the cam groove in the conventional optical diaphragm device. In this manner, the length of the first cam groove 330 can be shortened and hence, the number of first cam grooves 330 which can be formed in the drive ring 300 can be easily increased. Because of such an advantageous effect, the number of diaphragm blades 100 can be also easily increased. The number of light leakage prevention blades 200 each forms a pair with the corresponding diaphragm blade 100 can be also easily increased.

(2) Arrangement Relationship Between Set of First Fixing Boss 120 and First Hole 401j and Set of Second Fixing Boss 220 and Second Hole 402j As described previously, in the optical diaphragm device 10 according to the embodiment, the set of the first fixing boss 120 and the first hole 401j is disposed at the position which differs from the position where the set of the second fixing boss 220 and the second hole 402j is positioned with respect to a distance from the optical axis OA. Accordingly, the plurality of sets of the first fixing boss 120 and the first hole 401j and the plurality of sets of the second fixing boss 220 and the second hole 402j are respectively formed on respective circumferences which differ from each other in distance from the optical axis OA. Accordingly, it is possible to easily increase the number of pairs each consisting of the set of the first fixing boss 120 and the first hole 401j and the set of the second fixing boss 220 and the second hole 402j. As a result, it is possible to easily increase the number of diaphragm blades 100.

The above-mentioned arrangement relationship is described in more detail with reference to FIG. 5A and FIG. 5B.

Figure 5A:
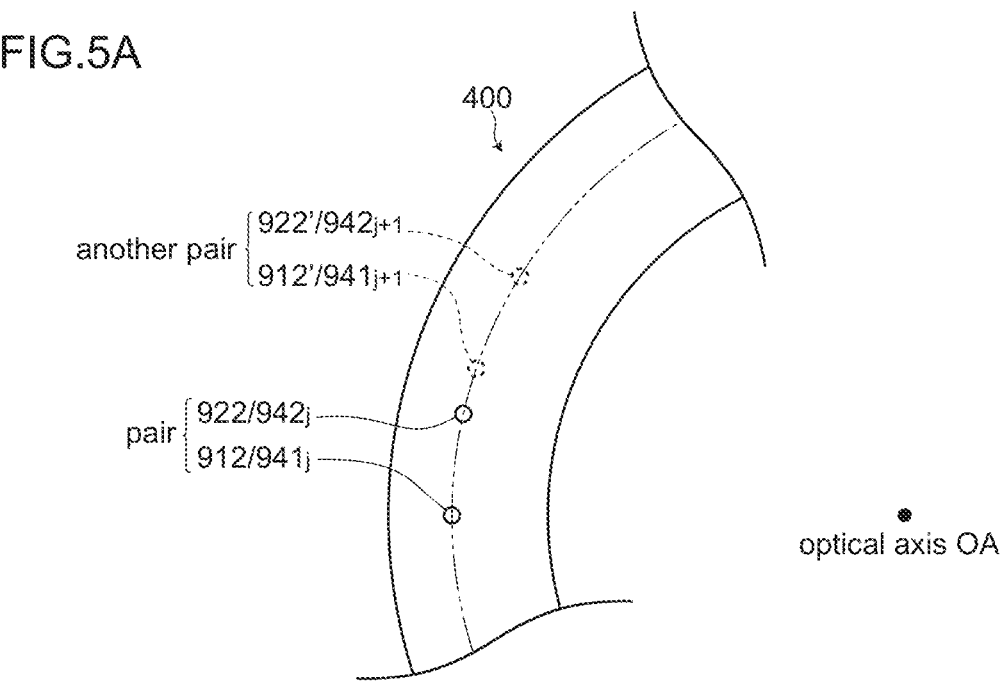
FIG. 5A and FIG. 5B are plan views for describing an advantageous effect acquired by the optical diaphragm device 10 according to the embodiment 1.
Figure 5B:
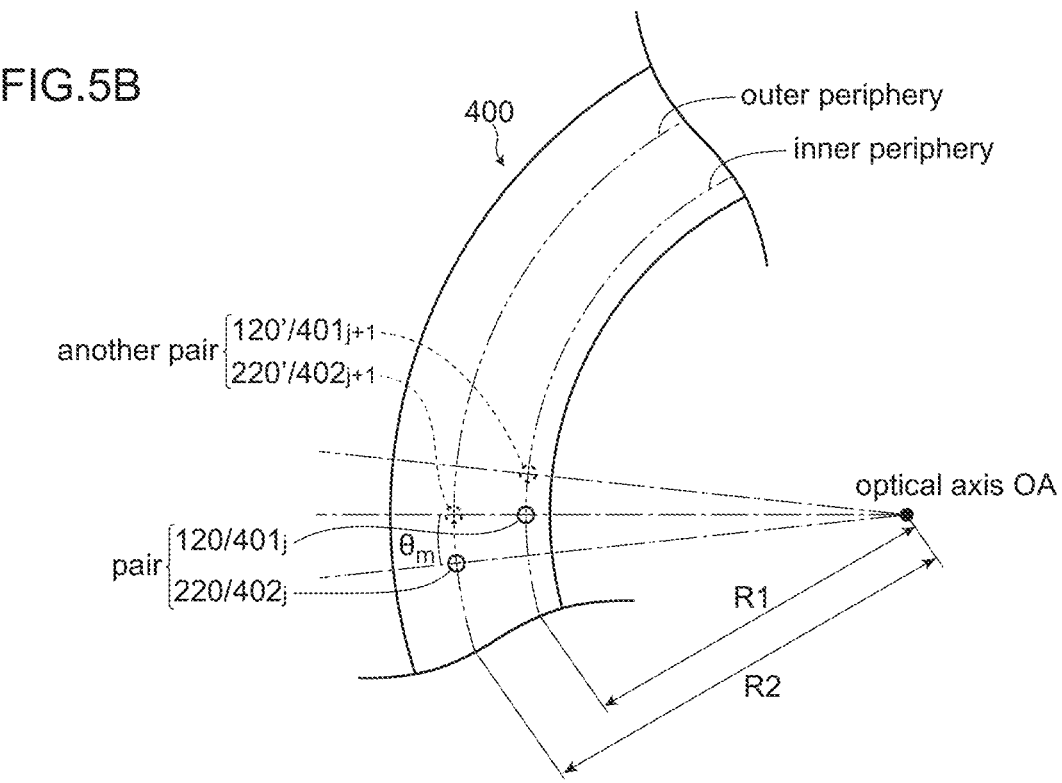

FIG. 5A and FIG. 5B are plan views for describing an advantageous effect acquired by the optical diaphragm device 10 according to the embodiment 1. FIG. 5A is a view which corresponds to the conventional optical diaphragm device 900, and FIG. 5B is a view which corresponds to the optical diaphragm device 10 according to the embodiment 1. In FIG. 5A and FIG. 5B, only a part of the housing body 400 is shown.

FIG. 5A shows the arrangement relationship between the set of the diaphragm blade fixing boss 912 and the first hole 941j (j: an integer of 1 or more) and the set of the light leakage prevention blade fixing boss 922 and the second hole 942j (j: an integer of 1 or more).

FIG. 5B shows the arrangement relationship between the set of the first fixing boss 120 and the first hole 401j (j: an integer of 1 or more) and the set of the second fixing boss 220 and the second hole 402j (j: an integer of 1 or more). Other constitutional elements are not shown in the drawing.

(a) Conventional Optical Diaphragm Device

In the optical diaphragm device in accordance with the conventional optical diaphragm device 900, as shown also in FIG. 5A, the set of the diaphragm blade fixing boss 912 and the first hole 941j and the set of the light leakage prevention blade fixing boss 922 and the second hole 942j are disposed at the same position in distance from the optical axis OA. That is, the set of the diaphragm blade fixing boss 912 and the first hole 941j and the set of the light leakage prevention blade fixing boss 922 and the second hole 942j are disposed on the same circumference.

Accordingly, in increasing the number of diaphragm blades 910, it is necessary to increase the number of pairs each consisting of the set of the diaphragm blade fixing boss and the first hole and the set of the light leakage prevention blade fixing boss and the second hole disposed on the same circumference. In this case, it is necessary to take into account a distance between the set of the diaphragm blade fixing boss 912 and the first hole 941j and the set of the light leakage prevention blade fixing boss 922 and the second hole 942j. Further, it is also necessary to take into account a distance between the pair consisting of the set of the diaphragm blade fixing boss 912 and the first hole 941j and the set of the light leakage prevention blade fixing boss 922 and the second hole 942j and another pair consisting of the set of the diaphragm blade fixing boss 912' and the first hole 941j+1 and the set of the light leakage prevention blade fixing boss 922' and the second hole 942j+1.

Accordingly, it is difficult to increase the number of diaphragm blades 910 in the conventional optical diaphragm device.

(b) Optical Diaphragm Device According to Embodiment 1

On the other hand, in the optical diaphragm device 10 according to the embodiment 1, the set of the first fixing boss 120 and the first hole 401j and the set of the second fixing boss 220 and the second hole 402j are disposed at positions which differ from each other in distance from the optical axis OA. In other words, the set of the first fixing boss 120 and the first hole 401j and the set of the second fixing boss 220 and the second hole 402j are disposed in a displaced manner toward an inner peripheral side and toward an outer peripheral side.

Accordingly, as shown in FIG. 5B, it is possible to arrange the set of the first fixing boss 120 and the first hole 401j and the set of the second fixing boss 220 and the second hole 402j on respective circumferences (on the inner circumference and the outer circumference) which differ from each other in distance from the optical axis OA.

Accordingly, the degree of freedom in designing is increased and hence, the number of pairs each consisting of the set of the first fixing boss 120 and the first hole 401j and the set of the second fixing boss 220 and the second hole 402j can be easily increased. As a result, the number of diaphragm blades 100 is easily increased.

There may be a case where it is necessary to take into account an inter-distance between the set of the first fixing boss 120 and the first hole 401j and the set of the first fixing boss 120' and the first hole 401j+1 disposed adjacently to the set of the first fixing boss 120 and the first hole 401j on the same circumference, for example. However provided that a difference between the inner diameter R1 and the outer diameter R2 (also with reference to FIG. 4A) is sufficiently large compared to an inter-distance between the set of the first fixing boss 120 and the first hole 401j and the set of the first fixing boss 120' and the first hole 401j+1 disposed adjacently to the set of the first fixing boss 120 and the first hole 401j, in designing the diaphragm device, as shown in FIG. 5B, it is sufficient to ensure a predetermined margin θm between the set of the first fixing boss 120 and the first hole 401j and the set of the first fixing boss 120' and the first hole 401j+1 disposed adjacently to the set of the first fixing boss 120 and the first hole 401j.

With such a configuration, according to the optical diaphragm device of the present invention, the number of first cam grooves, the number of first fixing bosses and the first holes and the like can be easily increased and hence, it is possible to provide the diaphragm device where the number of diaphragm blades can be easily increased.

4. Other Detailed Structures of Optical Diaphragm Device 10 According to Embodiment 1

(1) Structure Where First Fixing Bosses 120 are Disposed on an Inner Peripheral Side As shown in FIG. 3, FIG. 4A and FIG. 4B, in the optical diaphragm device 10 according to the embodiment 1, the set of the first fixing boss 120 and the first hole 401j is disposed at the position where the distance between the set of the first fixing boss 120 and the first hole 401j and the optical axis OA is shorter than the distance between the set of the second fixing boss 220 and the second hole 402j and the optical axis OA. That is, the set of the first fixing boss 120 and the first hole 401j is disposed on an inner peripheral side of the set of the second fixing boss 220 and the second hole 402j.

The position where the set of the first fixing boss 120 and the first hole 401j is disposed is, in other words, the position where the rotary shaft of the diaphragm blade 100 is disposed.

In such a configuration, an attention is focused on a rotation angle of the diaphragm blade 100 which rotates between a position in a state where the aperture diameter AD of the diaphragm aperture is maximized (fully open state) and a position in a state where the aperture diameter AD of the diaphragm aperture is minimized (minimum aperture state). In general, the nearer the rotary shaft of the diaphragm blade 100 is disposed to the optical axis OA, the larger the rotation angle becomes. When the rotation angle of the diaphragm blade 100 is increased, in general, driving of the diaphragm blade 100 is minimally affected by irregularities in manufacture in positions, sizes or the like of the first fixing boss 120, the first hole 401j, the moving boss 130, and the first cam groove 330 of the drive ring 300 and the like.

In view of the above, it is possible to realize the diaphragm aperture with high accuracy as a whole by arranging the set of the first fixing boss 120 and the first hole 401j at a position where the distance from the optical axis OA to the set of the first fixing boss 120 and the first hole 401j is shorter than the distance from the optical axis OA to the set of the second fixing boss 220 and the second hole 402j, that is, by arranging the rotary shaft of the diaphragm blade 100 at the position closer to the optical axis OA.

Further, in general, along with the increase of a distance between the position at which the rotary shaft of the diaphragm blade 100 is disposed and the optical axis OA, it is necessary to increase a length of the diaphragm blade 100.

In view of the above, the length of the diaphragm blade 100 can be decreased by arranging the rotary shaft of the diaphragm blade 100 closer to the optical axis OA (by arranging the set of the first fixing boss 120 and the first hole 401j at the position closer to the optical axis OA than the position of the set of the second fixing boss 220 and the second hole 402j). By decreasing the length of the diaphragm blade 100, inertia of the diaphragm blade 100 during rotation can be decreased and hence, accuracy of rotation and velocity can be enhanced. Downsizing of the optical diaphragm device 10 can be also realized.

(2) Structure Where Set of First Fixing Boss 120 and First Hole 401j and Set of Second Fixing Boss 220 and Second Hole 402j are Disposed in the Same Radial Direction As shown in FIG. 3, FIG. 4A and FIG. 4B, in the optical diaphragm device 10 according to the embodiment 1, the set of the first fixing boss 120 and the first hole 401j, and the set of the second fixing boss 220 and the second hole 402j are arranged on the same straight line extending in a radial direction (r direction) from the optical axis OA. That is, the optical axis OA, the set of the first fixing boss 120 and the first hole 401j, and the set of the second fixing boss 220 and the second hole 402j are arranged on the same straight line.

With such a configuration, an angle which the set of the first fixing boss and the first hole 401j and the set of the second fixing boss and the second hole 402j which form a pair occupy (an angle made by a line which connects the set of the first fixing boss and the first hole 401j with the optical axis OA and a line which connects the set of the second fixing boss and the second hole 402j with the optical axis OA) can be minimized. That is, such an occupied angle can be set to 0°

As described above, the occupied angle can be minimized and hence, it is possible to arrange the larger number of pairs each consisting of the set of the first fixing boss 120 and the first hole 401j and the set of the second fixing boss 220 and the second hole 402j around the optical axis OA whereby the degree of freedom in designing the optical diaphragm device can be enhanced.

With such a configuration, it is possible to provide the optical diaphragm device which enables easy working (drilling) and inspection of the optical diaphragm device 10. For example, when the first holes 401j and the second holes 401j are formed in the housing body 400 by working with reference to the optical axis OA, it is sufficient that the first holes 401j are formed by working and, thereafter, the second holes 402j are formed by working while changing a distance only in a radial direction without changing an angle with respect to the optical axis OA. Accordingly, working can be continued without performing a step of changing an angle.

Substantially the same manner of operation and advantageous effects can be acquired also in the inspection of the optical diaphragm device.

(3) Recessed Portion 114 Formed by Cutting Out Outer Peripheral Edge of Diaphragm Blade 100

As shown in FIG. 3, FIG. 4A and FIG. 4B, in the optical diaphragm device 10 according to the embodiment 1, a recessed portion 114 is formed on an outer peripheral edge 112 of the diaphragm blade 100. The recessed portion 114 is formed so as to allow the moving boss 130' relating to the diaphragm blade 100' (see double-dashed chain line in FIG. 4A) and a light leakage prevention blade (not shown in the drawing) which form another pair to be disposed in the recessed portion 114 when the diaphragm blade 100 is moved to the position where the aperture diameter of the diaphragm aperture becomes maximum.

A width of the diaphragm blade 100 is decided depending on designing of the optical diaphragm device. Depending on a design of the diaphragm device, there may be a case where the outer peripheral edge 112 of the diaphragm blade 100 interferes with the moving boss relating to the diaphragm blade and the light leakage prevention blade which form another pair which is the neighboring pair in a plan-view layout. In a case when there exists a concern that such interference occurs, a design may be considered where the moving boss is disposed at the position which is further shifted in a radial direction (r direction) so as to move the moving boss away from the outer peripheral edge 112. However, in this case, the optical diaphragm device becomes large-sized by an amount that the moving boss is shifted.

On the other hand, in the embodiment 1, the recessed portion 114 is formed on the outer peripheral edge 112 of the diaphragm blade 100. Accordingly, it is possible to avoid the interference between the diaphragm blade 100 out of the diaphragm blade 100 and the light leakage prevention blade 200 which form a pair with the moving boss 130' relating to the diaphragm blade 100' and the light leakage prevention blade (not shown in drawing) which form another pair. As a result, large-sizing of the optical diaphragm device can be suppressed.

(4) Inclination Direction of First Cam Groove 330

(a) In the optical diaphragm device 10 according to the embodiment 1, as shown in FIG. 4A, the first cam groove 330 is formed at an angle which is inclined in a direction away from the optical axis OA toward a diaphragm rotational direction ROT with respect to a circumferential direction about the optical axis OA.

With respect to a rotational direction of the drive ring 300, a direction along which the diaphragm blade 100 is moved toward the optical axis OA by moving the first cam groove 330 due to the rotation of the drive ring 300 is assumed as the diaphragm rotational direction ROT.

In the optical diaphragm device 10 according to the embodiment 1, the first cam grooves 330 having such inclination are formed. Accordingly, when the drive ring 300 is rotated in the diaphragm rotational directional ROT, the position of the moving boss 130 inserted into the first cam groove 330 formed in the drive ring 300 is moved in a direction that the moving boss 130 approaches the optical axis OA. Due to such a configuration, a length of the first cam groove 330 can be shortened compared to the configuration where the inclination direction of the first cam groove 330 is set in an opposite manner.

(b) Further, in the optical diaphragm device 10 according to the embodiment 1, it is preferable that the first cam grooves 330 are formed in the following direction.

Figure 6:
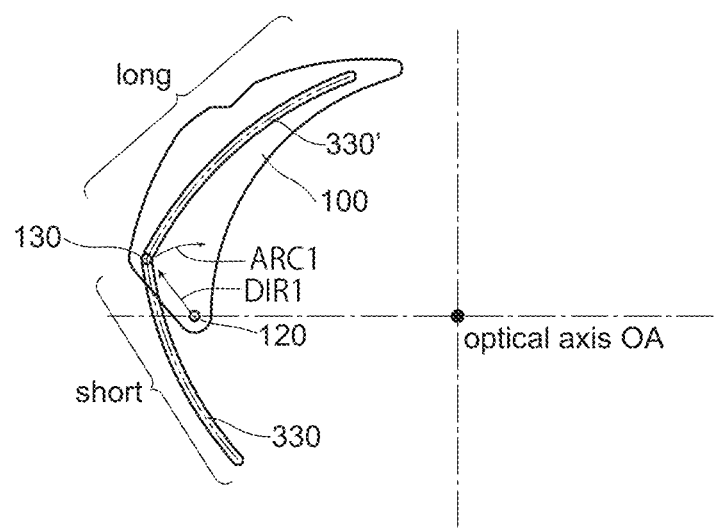
FIG. 6 is a view for describing an arrangement direction of the first cam groove 330 in the embodiment 1.

FIG. 6 is a view for describing an arrangement direction of the first cam groove 330 according to the embodiment 1. To be more specific, FIG. 6 is a view of the first cam groove 330/330' and the diaphragm blade 100 as viewed in a plan view along the optical axis OA in a state where the first cam groove 330/330' and the diaphragm blade 100 overlap with each other.

In FIG. 6, an outer extension (a profile) of the drive ring 300 is not indicated, and only the first cam groove is indicated. The diaphragm blade 100 is disposed at the position where the optical diaphragm device 10 is in a fully open state.

In FIG. 6, symbol 330 indicates a preferred arrangement example of the first cam groove. Symbol 330' indicates an arrangement example of the first cam groove in a comparison example in a state where the first cam groove overlaps with the diaphragm blade 100 together with the indication of symbol 330.

In FIG. 6, a direction directed from the first fixing boss 120 toward the moving boss 130 is indicated as DIR1. DIR1 is a direction directed from a fulcrum (the first fixing boss 120 and the first hole 401j) when the diaphragm blade 100 is rotated to a point where a force is applied (moving boss 130) when the diaphragm blade 100 is rotated.

In FIG. 6, an arc which the moving boss 130 draws until the diaphragm blade 100 reaches minimum aperture state due to the rotation of the drive ring 300 in the diaphragm rotational direction ROT is indicated by an arrow ARC1.

In the optical diaphragm device 10 according to the embodiment 1, it is preferable that the first cam groove is disposed so as to extend in a direction opposite to DIR1 using the position of the moving boss 130 as a start point (the first cam groove being preferably disposed in a mode indicated by symbol 330 in FIG. 6). That is, it is preferable that the first cam groove be disposed so as to extend in a direction opposite to the direction directed from a fulcrum (the first fixing boss 120 and the first hole 401j) when the diaphragm blade 100 is rotated to the point where the force is applied (moving boss 130) when the diaphragm blade 100 is rotated. It is not always necessary that the direction opposite to the DIR1 is the direction completely opposite to DIR1.

With such a configuration, when the drive ring 300 is rotated in the diaphragm rotational direction ROT, the whole first cam groove 330 is moved in the direction following the direction indicated by an arrow of the ARC1. Accordingly, a moving amount that the moving boss 130 is moved along the ARC1 is also absorbed in the direction that the first cam groove 330 is moved. Accordingly, a length (stroke) of the first cam groove 330 necessary for moving the moving boss 130 can be shortened.

On the other hand, as the comparison example, FIG. 6 also shows the first cam groove 330' which is disposed so as to extend in the direction following DIR1 using the position of the moving boss 130 as a start point. FIG. 6 shows a mode where the first cam groove 330' is disposed at the position opposite to the first cam groove 330 described previously on the premise that the shapes of the optical diaphragm blade 100 and the light leakage prevention blade 200, widths of the drive ring 300 and the like are equal to the shapes, the widths and the like of the corresponding members shown in FIG. 4A and FIG. 4B. For the sake of comparison, the first cam groove 330' of the comparison example is indicated in a state where the indication of the first cam groove 330' is synthesized with the indication of the preferred first cam groove 330.

The first cam groove 330' of the comparison example is disposed so as to extend in a forward direction on the same side as DIR1 using the position of the moving boss 130 as a start point. In other words, the first cam groove 330' of the comparison example is disposed so as to extend in a direction from a fulcrum (the first fixing boss 120 and the first hole 401j) when the diaphragm blade 100 is rotated toward a point where a force is applied (moving boss 130) when the diaphragm blade 100 is rotated.

In this case, when the drive ring 300 is rotated in the diaphragm rotational direction (the counterclockwise rotation as viewed in a direction toward a surface of a paper on which the drawing is described in this case), the whole first cam groove 330' is moved in the direction opposite to the direction indicated by the arrow ARC1 (so-called the reverse flow direction).

Accordingly, also with respect to a moving amount that the moving boss 130 moves along the arc indicated by the arrow ARC1, a surplus length (stroke) of the first cam groove becomes necessary. Accordingly, the length (stroke) of the first cam groove 330' necessary for moving the moving boss 130 becomes larger than the length of the previously described preferred first cam groove 330.

As described above, by adopting the direction of arrangement of the preferred first cam groove (the arrangement example indicated by symbol 330 being adopted in the drawing), the length (stroke) of the first cam groove 330 can be further shortened. Accordingly, the number of the first cam grooves 330 can be easily increased. As a result, it is possible to provide diaphragm device where the number of diaphragm blades can be further easily increased.

(5) Angle Made by First Cam Groove 330 and Circumferential Direction and Angle Made by Second Cam Groove 230 and Circumferential Direction As shown in FIG. 2A, FIG. 4A and the like, in the optical diaphragm device 10 according to the embodiment 1, an angle made by the second cam groove 230 and the circumferential direction is set larger than an angle made by the first cam groove 330 and the circumferential direction. That is, the second cam groove 230 makes a large (deep) angle with respect to the circumferential direction, and the first cam groove 330 makes a small (shallow) angle with respect to the circumferential direction.

With such a configuration, it is possible to make a track of the second cam groove 230 (a moving path of the moving boss 130) further approximate an arc which the moving boss 230 draws when the moving boss 130 is rotated about the first fixing boss 120. Accordingly, compared to the case where an angle made by the second cam groove 230 and the circumferential direction is small (shallow) (in the case where such an angle being equal to or less than an angle made by the first cam groove 330 and the circumferential direction), a force with which the second cam groove 230 and the moving boss 130 come into contact with each other in the circumferential direction can be decreased and hence, the diaphragm blade 100 and the light leakage prevention blade 200 can be smoothly rotated.

(6) Lengths of First Cam Groove 330 and Second Cam Groove 230

As shown in FIG. 4A and FIG. 4B, in the optical diaphragm device 10 according to the embodiment 1, an extension length of the second cam groove 230 is shorter than an extension length of the first cam groove 330.

With such a configuration, it is possible to make the first cam groove 330 as close as possible to a full width of the drive ring 300 and hence, it is possible to increase an amount (stroke amount) of moving the blade toward the inner direction while effectively as much as possible using the drive ring 300 having the narrow width.

Further, in the above-mentioned optical diaphragm device 10, it is sufficient to form the second cam groove 230 having a required minimum length and hence, the light leakage prevention blade 200 can be also formed in a compact shape. Such structure contributes to downsizing of the optical diaphragm device 10.

Embodiment 2

Next, an optical diaphragm devices 10a, 10a' according to an embodiment 2 are described with reference to FIG. 7A and FIG. 7B.

Figure 7A:
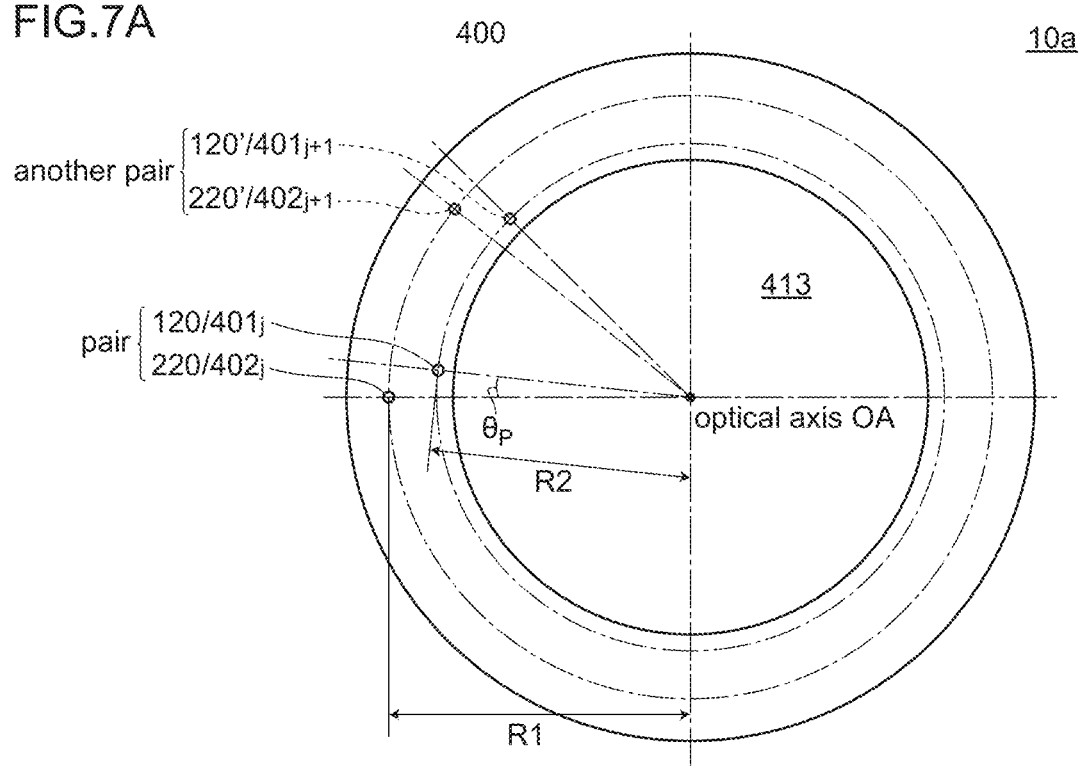
FIG. 7A and FIG. 7B are plan views for describing optical diaphragm devices 10a, 10a' according to an embodiment 2.
Figure 7B:
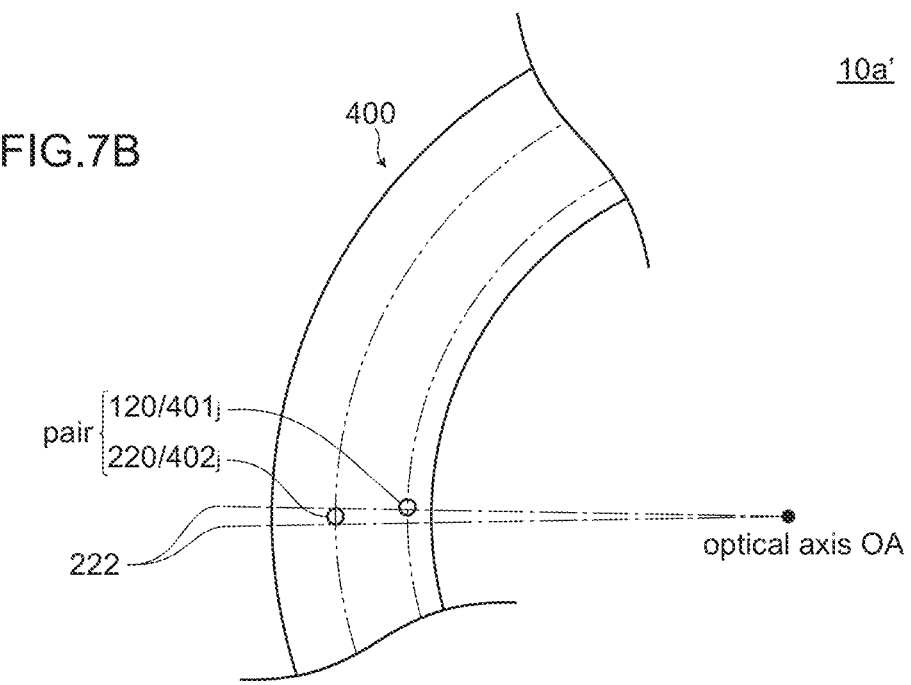

FIG. 7A and FIG. 7B are plan views for describing the optical diaphragm devices 10a, 10a' according to the embodiment 2. In FIG. 7A and FIG. 7B, only a housing body 400 is shown. Further, FIG. 7a and FIG. 7B show the arrangement relationship of a first hole 401j and a second hole 402j (j: an integer of 1 or more) into which a first fixing boss 120 and a second fixing boss 220 are inserted respectively. Other constitutional elements are omitted from the drawing.

The optical diaphragm devices 10a, 10a' according to the embodiment 2 have basically substantially the same configuration as the optical diaphragm device 10 according to the embodiment 1. However, the optical diaphragm devices 10a, 10a' according to the embodiment 2 differ from the optical diaphragm device 10 according to the embodiment 1 with respect to the relative arrangement relationship between a set of the first fixing boss 120 and the first hole 401j and a set of the second fixing boss 220 and the second hole 402j which form a pair.

That is, as shown in FIG. 7A, in the optical diaphragm device 10a according to the embodiment 2, the set of the first fixing boss 120 and the first hole 401j and the set of the second fixing boss 220 and the second hole 402j which form a pair are not disposed on the same straight line extending from an optical axis OA in a radial direction, and the set of the first fixing boss 120 and the first hole 401j and the set of the second fixing boss 220 and the second hole 402j are disposed in a state where these sets are offset from each other in the circumferential direction. In other words, the set of the first fixing boss 120 and the second hole 402j and the set of the second fixing boss 220 and the second hole 402j which form a pair are disposed in a shape where an angle θp (θp being an angle other than 0°) is occupied by the set of the first fixing boss 120 and the first hole 401j and the set of the second fixing boss 220 and the second hole 402j which form a pair.

With such a configuration, the desired optical diaphragm device 10a can be acquired by designing the optical diaphragm device 10a with the configuration where the set of the first fixing boss 120 and the first hole 401j and the set of the second fixing boss 220 and the second hole 402j are suitably offset from each other in the circumferential direction corresponding to premise conditions such as lengths, shapes, and the number of pieces of diaphragm blades 100 and light leakage prevention blades 200, a width of the drive ring 300 and the like.

As shown in FIG. 7B, in the device 10a' according to the embodiment 2, a set of a first fixing boss 120 and a first hole 401j and a set of a second fixing boss 220 and a second hole 402j are disposed in a state where these sets are offset from each other in a circumferential direction, and a portion of the set of the first fixing boss 120 and the first hole 401j disposed on an inner peripheral side overlaps with the inside of an angular region surrounded by two lines 222 which connect a profile of a set of the second fixing bosses 220 and the second holes 402j disposed on an outer peripheral side and the optical axis OA to each other.

The optical diaphragm device 10a' has such a configuration. Accordingly, it is possible to further decrease an angle which is occupied by the set of the first fixing boss 120 and the first hole 401j and the set of the second fixing boss 220 and the second hole 402j which form a pair compared to the diaphragm device 10a while designing the optical diaphragm device 10a' with the configuration where the set of the first fixing boss 120 and the first hole 401j and the set of the second fixing boss 220 and the second hole 402j are offset from each other in a circumferential direction. Accordingly, in the optical diaphragm device 10a', the larger number of pairs each consisting of the first fixing boss 120 and the first hole 401j can be disposed compared to the optical diaphragm device 10a according to the embodiment 2.

The optical diaphragm devices 10a, 10a' according to the embodiment 2 have substantially the same configurations as the optical diaphragm device 10 according to the embodiment 1 except for the arrangement relationship between the set of the first fixing boss 120 and the first hole 401j and the set of the second fixing boss 220 and the second hole 402j which form a pair. Accordingly, the optical diaphragm devices 10a, 10a' according to the embodiment 2 acquire the corresponding advantageous effects found amongst all advantageous effects which the optical diaphragm device 10 according to the embodiment 1 acquires.

Embodiment 3

Next, an optical diaphragm device 10b according to an embodiment 3 is described with reference to FIG. 8.

Figure 8:
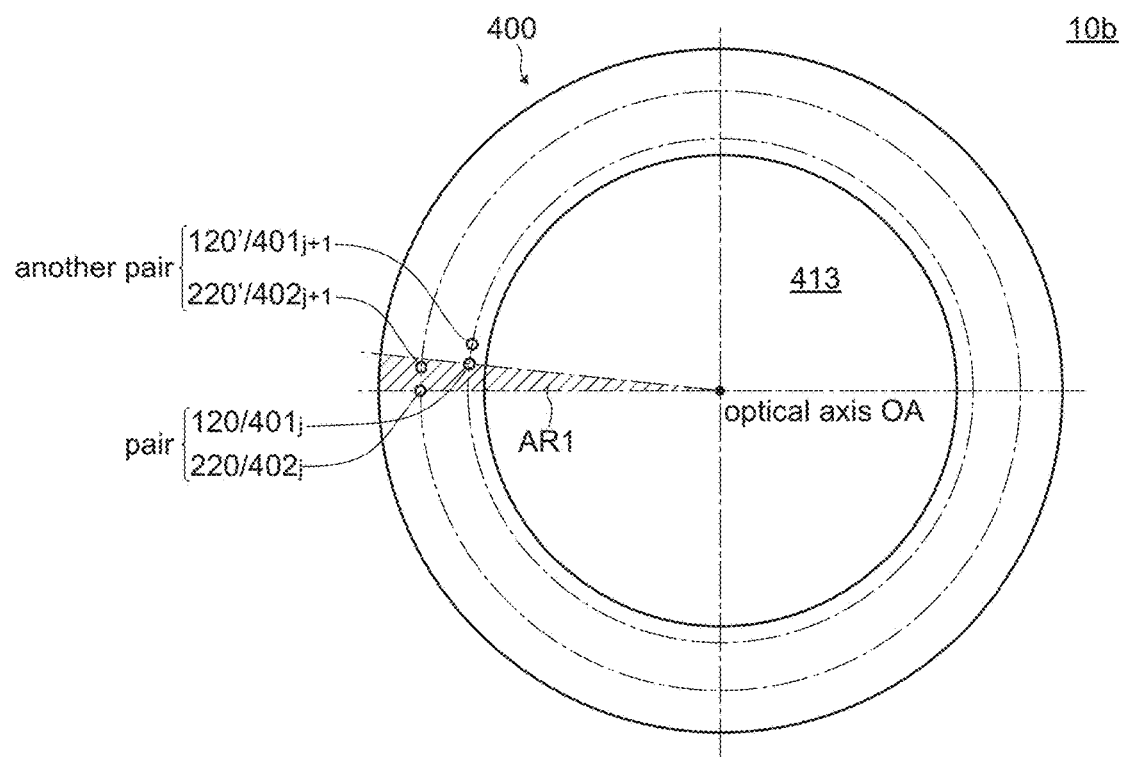
FIG. 8 is a plan view for describing an optical diaphragm device 10b according to an embodiment 3.

FIG. 8 is a plan view for describing the optical diaphragm device 10b according to the embodiment 3. In FIG. 8, only a housing body 400 is shown. Further, FIG. 8 shows the arrangement relationship between a set of a first fixing boss 120 and a first hole 401j and a set of a second fixing boss 220 and a second hole 402j. Other constitutional elements are omitted from the drawing.

The optical diaphragm device 10b according to the embodiment 3 has basically substantially the same configuration as the optical diaphragm device 10 according to the embodiment 1 and the optical diaphragm device 10a according to the embodiment 2. However, the optical diaphragm device 10b according to the embodiment 3 differs from the optical diaphragm device 10 according to the embodiment 1 and the optical diaphragm device 10a according to the embodiment 2 with respect to the arrangement relationship between a set of the first fixing boss 120 and the first hole 401j and a set of the second fixing boss 220 and the second hole 402j which form a pair.

That is, as shown in FIG. 8, in the optical diaphragm device 10b according to the embodiment 3, out of a set of a first fixing boss 120' and a first hole 401j and a set of a second fixing boss 220' and a second hole 402j which form another pair, the boss and the hole of either one of the sets (the second fixing boss 220' and the second hole 402j in FIG. 8) are at least partially overlap with the inside of an angular region AR1 occupied by the set of the first fixing boss 120 and the first hole 401j and the set of the second fixing boss 220 and the second hole 402j which form a pair.

The optical diaphragm device 10b has such a configuration. Accordingly, in the optical diaphragm device 10b, the larger number of pairs each consisting of the first fixing boss 120 and the first hole 401j can be disposed compared to the optical diaphragm device 10a according to the embodiment 2 while designing the optical diaphragm device 10b with the configuration where the set of the first fixing boss 120 and the first hole 401j and the set of the second fixing boss 220 and the second hole 402j are offset from each other in a circumferential direction.

The optical diaphragm device 10b according to the embodiment 3 has substantially the same configuration as the optical diaphragm device 10 according to the embodiment 1 and the optical diaphragm device 10a according to the embodiment 2 except for the arrangement relationship between the set of the first fixing boss 120 and the first hole 401j and the set of the second fixing boss 220 and the second hole 402j which form a pair. Accordingly, the optical diaphragm device 10b according to the embodiment 3 acquires the corresponding advantageous effects found amongst all advantageous effects which the optical diaphragm device 10 according to the embodiment 1 and the optical diaphragm device 10a according to the embodiment 2 acquire in the same manner.

Embodiment 4

Figure 9:
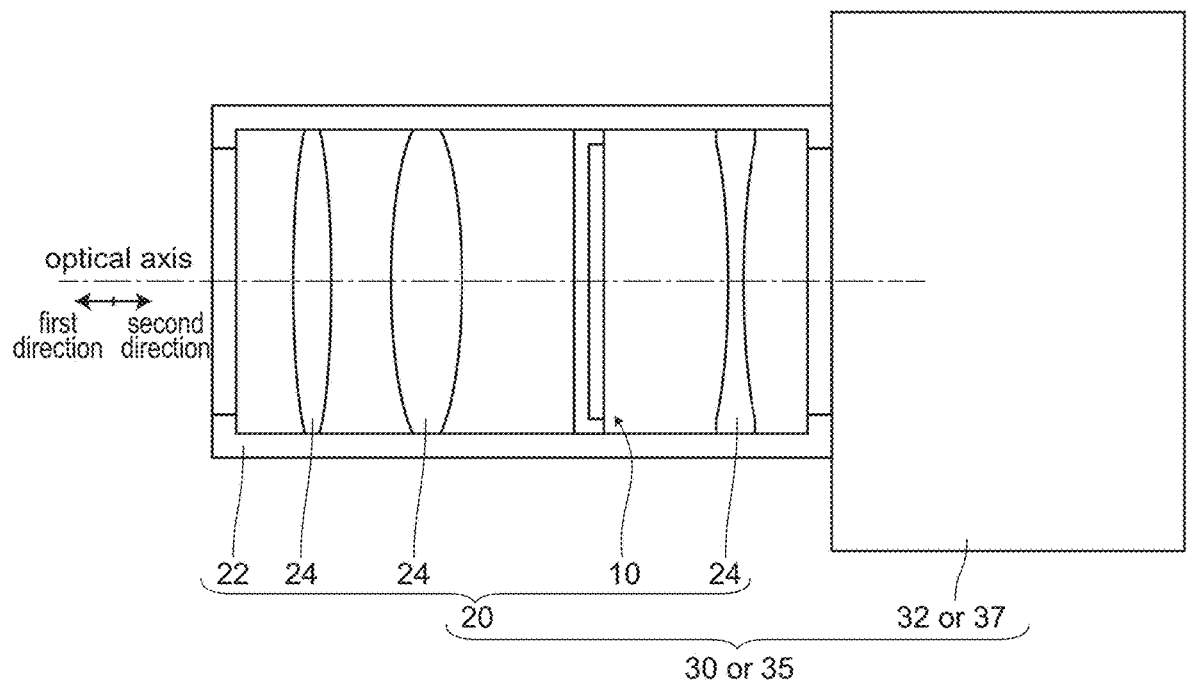
FIG. 9 is a schematic view for describing a lens barrel 20 according to an embodiment 4 and an imaging device 30 or a projection device 35 according to an embodiment 5.
Figure 10A:
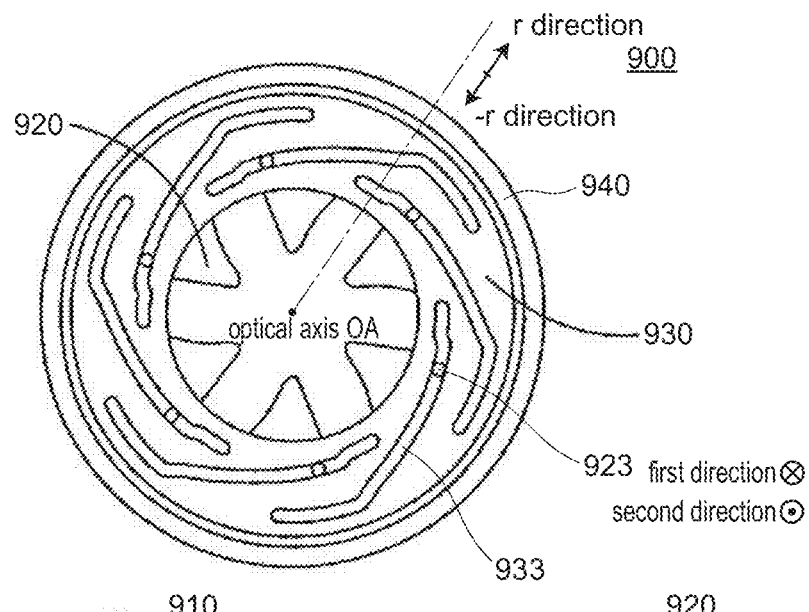
FIG. 10A to FIG. 10D are plan views for describing a conventional optical diaphragm device 900.
Figure 10B:
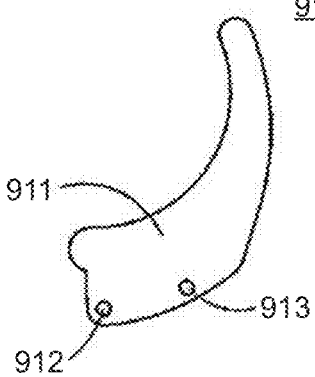
Figure 10C:
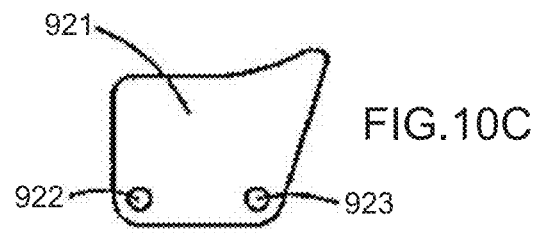
Figure 10D:
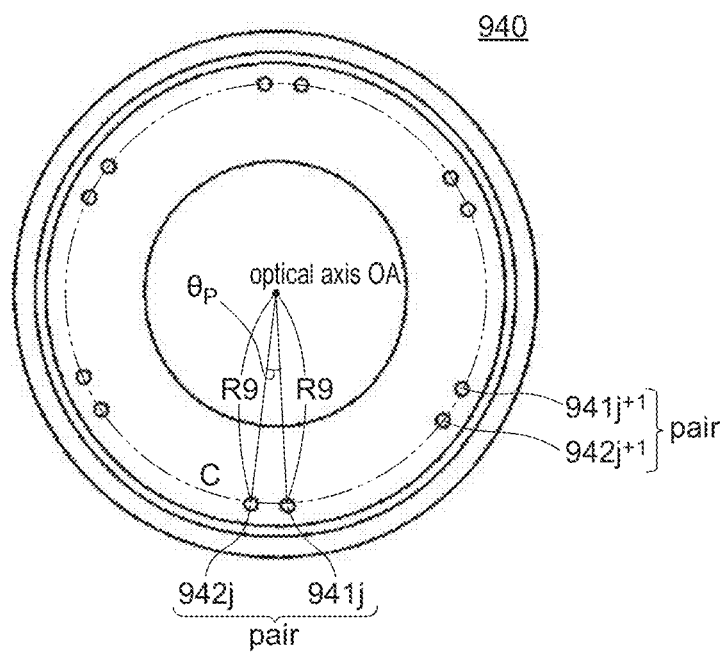

FIG. 9 is a schematic view for describing a lens barrel 20 according to an embodiment 4 and an imaging device 30 or a projection device 35 according to an embodiment 5.

As shown in FIG. 9, in the lens barrel 20 according to the embodiment 4, the optical diaphragm device 10 according to the embodiment 1 and a plurality of lenses 24 are housed.

The lens barrel 20 according to the embodiment 4 includes the optical diaphragm device 10 according to the embodiment 1 and hence, it is possible to provide the lens barrel 20 where large-sizing of the lens barrel 20 can be suppressed, and a favorable imaging state can be acquired.

In the embodiment 4, the optical diaphragm device 10a, 10a' according to the embodiment 2, or the optical diaphragm device 10b according to the embodiment 3 can be adopted in place of the optical diaphragm device 10 according to the embodiment 1.

Embodiment 5

As shown in FIG. 9, an imaging device 30 according to the embodiment 5 includes: the optical diaphragm device 10 according to the embodiment 1 or the lens barrel 20 according to the embodiment 4, and an imaging device body 32. The imaging device 30 according to the embodiment 5 is applicable to a camera or the like, for example.

As shown in FIG. 9, a projection device 35 according to the embodiment 5 includes the optical diaphragm device 10 according to the embodiment 1 or the lens barrel 20 according to the embodiment 4; and a projection device body 37. The projection device 35 according to the embodiment 5 is applicable to a projector or the like, for example.

The imaging device 30 or the projection device 35 according to the embodiment 5 includes: the optical diaphragm device 10 according to the embodiment 1 or the lens barrel 20 according to the embodiment 3. With such a configuration, large-sizing of the imaging device 30 or the projection device 35 can be suppressed. It is also possible to provide the imaging device 30 where a favorable imaging state can be acquired, or the projection device 35 where a favorable projection state can be acquired.

In the embodiment 5, the optical diaphragm device 10a, 10a' according to the embodiment 2 or the optical diaphragm device 10b according to the embodiment 3 may be applicable in place of the optical diaphragm device 10 according to the embodiment 1.

Although the present invention has been described based on the above-mentioned embodiments, the present invention is not limited to the above-mentioned embodiments, and the present invention can be carried out without departing from the gist of the present invention, for example, the following modifications are also conceivable.

(1) The numbers, the materials, the shapes, the positions, the sizes and the like of the constitutional elements described in the above-mentioned embodiments are provided only for an exemplifying purpose, and these can be changed within ranges where advantageous effects of the present invention are not impaired.

(2) In the embodiment 1, the embodiment 2, and the embodiment 3, the case has been exemplified by taking the imaging device such as a camera. However, the present invention is not limited to such an example, and is also applicable to a projection device such as a projector, for example.

(3) In the embodiment 1, the embodiment 2, and the embodiment 3, "bosses" named as the first fixing boss 120, the second fixing boss 220 and the moving boss 130 are respectively formed of a circular cylindrical body having a fixed radius. However, the bosses are not limited to the configuration where the boss has a fixed diameter. It is sufficient that the first fixing boss 120 and the second fixing boss 220 have the shape which allows them to be formed as a rotary shaft. It is sufficient that the moving boss 130 be inserted through the first cam groove 330 and the second cam groove 230 and be capable of transmitting a force. For example, the moving boss 130 may be formed of a lead line having a radius of approximately 0, a conical shaped member, a mushroom shape member or the like.

The invention claimed is:

1. An optical diaphragm device capable of changing an aperture diameter of a diaphragm aperture by advancing or retracting a plurality of blades with respect to an optical axis, the optical diaphragm device comprising:
  a plurality of diaphragm blades each including: a first blade portion which is formed of a first planar plate and shields light incident on the diaphragm aperture of the optical diaphragm device; a first fixing boss which protrudes from one surface of the first planar plate toward a side in a first direction along the optical axis; and a moving boss which protrudes from the other surface of the first planar plate toward a side in a second direction opposite to the first direction;
  a plurality of light leakage prevention blades each including: a second blade portion which is formed of a second planar plate and shields light through light leaking portions other than the diaphragm aperture of the optical diaphragm device; and a second fixing boss which protrudes from one surface of the second planar plate toward the side in the first direction, the light leakage prevention blade forming a pair with the diaphragm blade;
  a drive ring having a plurality of first cam grooves into each of which the moving boss is inserted, wherein a distance between the first cam groove and the optical axis differs corresponding to a position of the first cam groove, and the first cam groove is movable in a circumferential direction about the optical axis due to rotation of the drive ring about the optical axis; and
  a housing body capable of accommodating the diaphragm blades, the light leakage prevention blades, and the drive ring, wherein
  the optical diaphragm device includes a plurality of pairs each consisting of the diaphragm blade and the light leakage prevention blade, and a plurality of the first cam grooves each of which corresponds to each of the moving bosses are formed in the drive ring,
  a plurality of pairs each consisting of a first hole and a second hole are formed in the housing body corresponding to the plurality of pairs each consisting of the diaphragm blade and the light leakage prevention blade, the number of pairs each consisting of the first hole and the second hole being equal to the number of pairs each consisting of the diaphragm blade and the light leakage prevention blade, the first fixing boss and the second fixing boss being inserted into the pair of the first hole and the second hole respectively,
  a second cam groove is formed in the light leakage prevention blade,
  the moving boss of the diaphragm blade is inserted into the second cam groove of the light leakage prevention blade, and is inserted into the first cam groove of the drive ring, and
  a position where a set of the first fixing boss and the first hole is disposed and a position where a set of the second fixing boss and the second hole is disposed differ from each other in distance from the optical axis.

2. The optical diaphragm device according to claim 1, wherein the set of the first fixing boss and the first hole is disposed at a position where the distance from the optical axis to the set of the first fixing boss and the first hole is shorter than the distance from the optical axis to the set of the second fixing boss and the second hole.

3. The optical diaphragm device according to claim 1, wherein the set of the first fixing boss and the first hole and the set of the second fixing boss and the second hole are arranged on a same straight line extending in a radial direction from the optical axis.

4. The optical diaphragm device according to claim 1, wherein
  on an outer peripheral edge of the diaphragm blade, a recessed portion is formed by cutting away such that when the diaphragm blade is moved to a position where the aperture diameter of the diaphragm aperture becomes maximum, the moving boss with respect to the diaphragm blade and the light leakage prevention blade which form another pair is disposed inside the recessed portion.

5. The optical diaphragm device according to claim 1, wherein with respect to a rotational direction of the drive ring, assuming a direction that the diaphragm blade is moved toward the optical axis by moving the first cam groove due to rotation of the drive ring as a diaphragm rotational direction,
  the first cam groove is formed at an angle inclined in a direction away from the optical axis as the first cam groove extends in the diaphragm rotational direction with respect to the circumferential direction about the optical axis.

6. The optical diaphragm device according to claim 1, wherein an angle of the second cam groove with respect to the circumferential direction is set large compared to an angle of the first cam groove with respect to the circumferential direction.

7. A lens barrel in which the optical diaphragm device according to claim 1 and a lens are housed.

8. An imaging device or a projection device comprising: the optical diaphragm device according to claim 1; or the lens barrel.

\* \* \* \* \*